United States Patent [19]
Stump et al.

[11] Patent Number: 5,819,859
[45] Date of Patent: *Oct. 13, 1998

[54] APPARATUS AND METHOD FOR DETECTING AN UNDERGROUND STRUCTURE

[75] Inventors: Gregory S. Stump, Terre Haute, Ind.; Christopher T. Allen, Independence, Mo.

[73] Assignee: Vermeer Manufacturing Company, Pella, Iowa

[*] Notice: The term of this patent shall not extend beyond the expiration date of Pat. No. 5,720,354.

[21] Appl. No.: 734,678

[22] Filed: Oct. 21, 1996

Related U.S. Application Data

[63] Continuation-in-part of Ser. No. 587,832, Jan. 11, 1996, Pat. No. 5,720,354.

[51] Int. Cl.$^6$ .............................. E21B 47/00; G01V 1/00
[52] U.S. Cl. ............................ 175/26; 175/45; 340/853.5
[58] Field of Search .................... 175/26, 45; 340/853.5, 340/853.6

[56] References Cited

U.S. PATENT DOCUMENTS

| | | |
|---|---|---|
| 3,718,930 | 2/1973 | McCullough et al. . |
| 3,781,879 | 12/1973 | Staras et al. . |
| 3,831,173 | 8/1974 | Lerner . |
| 3,975,735 | 8/1976 | McCullough et al. . |
| 4,297,699 | 10/1981 | Fowler et al. . |
| 4,698,634 | 10/1987 | Alongi et al. . |
| 4,710,708 | 12/1987 | Rorden et al. . |
| 4,728,897 | 3/1988 | Gunton . |
| 4,787,463 | 11/1988 | Geller et al. . |
| 4,806,869 | 2/1989 | Chau et al. . |
| 4,814,768 | 3/1989 | Chang . |
| 4,843,597 | 6/1989 | Gjessing et al. . |
| 4,881,083 | 11/1989 | Chau et al. . |
| 4,905,008 | 2/1990 | Kawano et al. . |

(List continued on next page.)

FOREIGN PATENT DOCUMENTS

90/15343  12/1990  WIPO .

OTHER PUBLICATIONS

Geophysical Survey Systems, Inc., Radan™—Radar Data Analyzer, Production Information Sheet, Jan. 1993.

(List continued on next page.)

Primary Examiner—William P. Neuder
Attorney, Agent, or Firm—Merchant, Gould, Smith, Edell, Welter & Schmidt, P.A.

[57] ABSTRACT

An apparatus and method for locating an underground object or structure by employment of a radar-like probe and detection technique is disclosed. The underground structure is provided with a device which generates a specific signature signal in response to a probe signal transmitted from above the ground. Cooperative action between the probe signal transmitter at ground level and the signature signal generating device provided on the underground object provides for accurate detection of the subsurface object, despite the presence of a large background noise signal. The depth and, if desired, orientation of the underground object may also be determined using the signature signal generated by the signature signal generating device mounted to the underground object. Orientation information may be encoded on the signature signal or transmitted as an information signal separate from the signature signal. The probe signal may be microwave or acoustic. The signature signal produced by the signature signal generating device mounted to the underground object may be generated either passively or actively. Further, the signature signal may be produced in a manner which differs from the probe signal in one or more ways, including phase, frequency content, information content, or polarization. Also, the signature signal generating device may produce both location and orientation information, without the need for a separate orientation detecting device. Alternatively, orientation and location information may be produced by independent orientation detection and signature signal generating devices.

26 Claims, 14 Drawing Sheets

U.S. PATENT DOCUMENTS

| | | |
|---|---|---|
| 4,907,658 | 3/1990 | Stangl et al. . |
| 4,912,643 | 3/1990 | Beirxe . |
| 4,953,638 | 9/1990 | Dunn . |
| 5,012,248 | 4/1991 | Munro et al. . |
| 5,065,098 | 11/1991 | Salsman et al. . |
| 5,070,462 | 12/1991 | Chau . |
| 5,092,657 | 3/1992 | Bryan, Jr. . |
| 5,155,442 | 10/1992 | Mercer . |
| 5,264,795 | 11/1993 | Rider . |
| 5,325,095 | 6/1994 | Vadnais et al. . |
| 5,337,002 | 8/1994 | Mercer . |
| 5,339,080 | 8/1994 | Steinway et al. . |
| 5,355,965 | 10/1994 | Rozendaal . |
| 5,384,715 | 1/1995 | Lytton . |
| 5,469,155 | 11/1995 | Archambeault et al. . |
| 5,499,029 | 3/1996 | Bashforth et al. . |

OTHER PUBLICATIONS

Geophysical Survey Systems, Inc., Subsurface Solutions, Winter 1995.

Geophysical Survey Systems, Inc., Sir® System–2 Subsurface Interface Radar, Brochure.

Geophysical Survey Systems, Inc., Sir® System—10A Subsurface Interface Radar, Brochure.

Geophysical Survey Systems, Inc., SIR® System Antennas, Brochure.

Geophysical Survey Systems, Inc., Model 3200MLF, Multiple, Low–Frequency, Bistatic Antenna, Brochure.

Geophysical Survey System, Inc., Subsurface Detection Problems, Brochure.

GeoRadar, Inc., Model 1000B, Stepped–FM Ground Penetrating Radar, Brochure.

Pollution Engineering, Peering Beneath the Surface, Article, Oct., 1992.

Sensors & Software, Inc., Pulse Ekko™ 100, Features, Brochure.

Sensors & Software, Inc., Pulse Ekko™ 100, Ground Penetrating Radar Technology, Brochure.

Sensors & Software, Inc., Pulse Ekko™ 100 Case Studies, pp. 80–83, 87–94, 98, 100, 129, 131.

Sensors & Software, Inc., Pulse Ekko™ 1000, Brochure.

Sensors & Software, Inc., Pulse Ekko™, Environment, Feb. 1994.

Weil et al., Investigation of Hazardous Waste Sites Using Thermal IR and Ground Penetrating Radar, Photogrammetric Engineering & Remote Sensing, vol. 60, No. 8, Aug. 1994, pp. 999–1005.

Kathage, A.F., Proceedings of the Fourth International Conference on Ground Penetrating Radar, Geological Survey of Finland, A Challenge: GPR in Advance of Horizontal Drilling, Special Paper 16, Jun., 1992, pp. 119–124.

Guenther, M. and Kathage, A. F., Proceedings of the Fifth Internations Conference on Ground Penetrating Radar, The Geophysical Investigation of Drilling Obstacles for Microtunnelling Projects by Means of GPR, vol. 3 of 3, Jun., 1994, pp. 1151–1165.

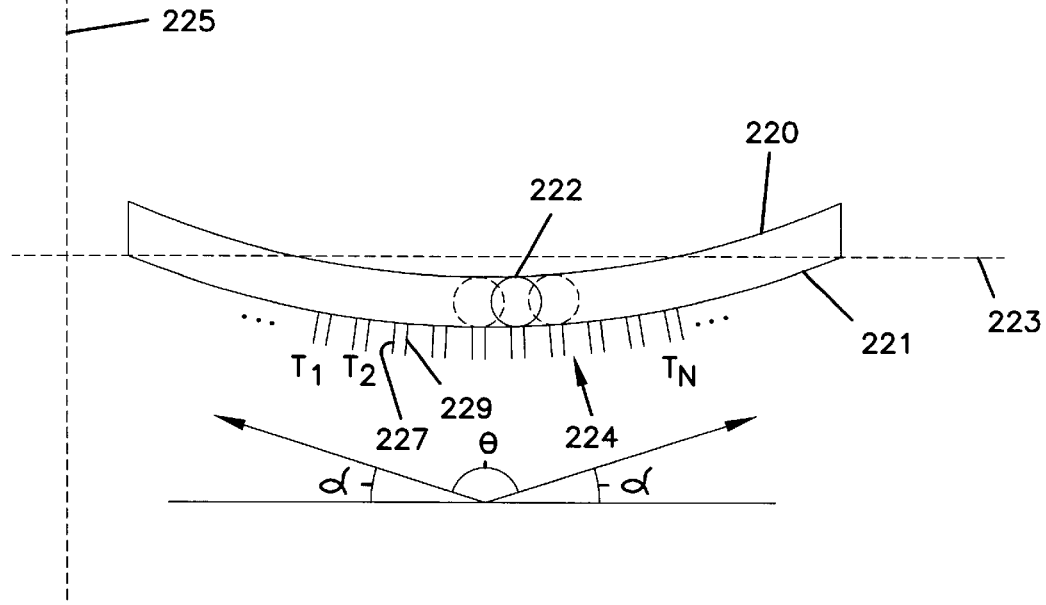
FIG. 11
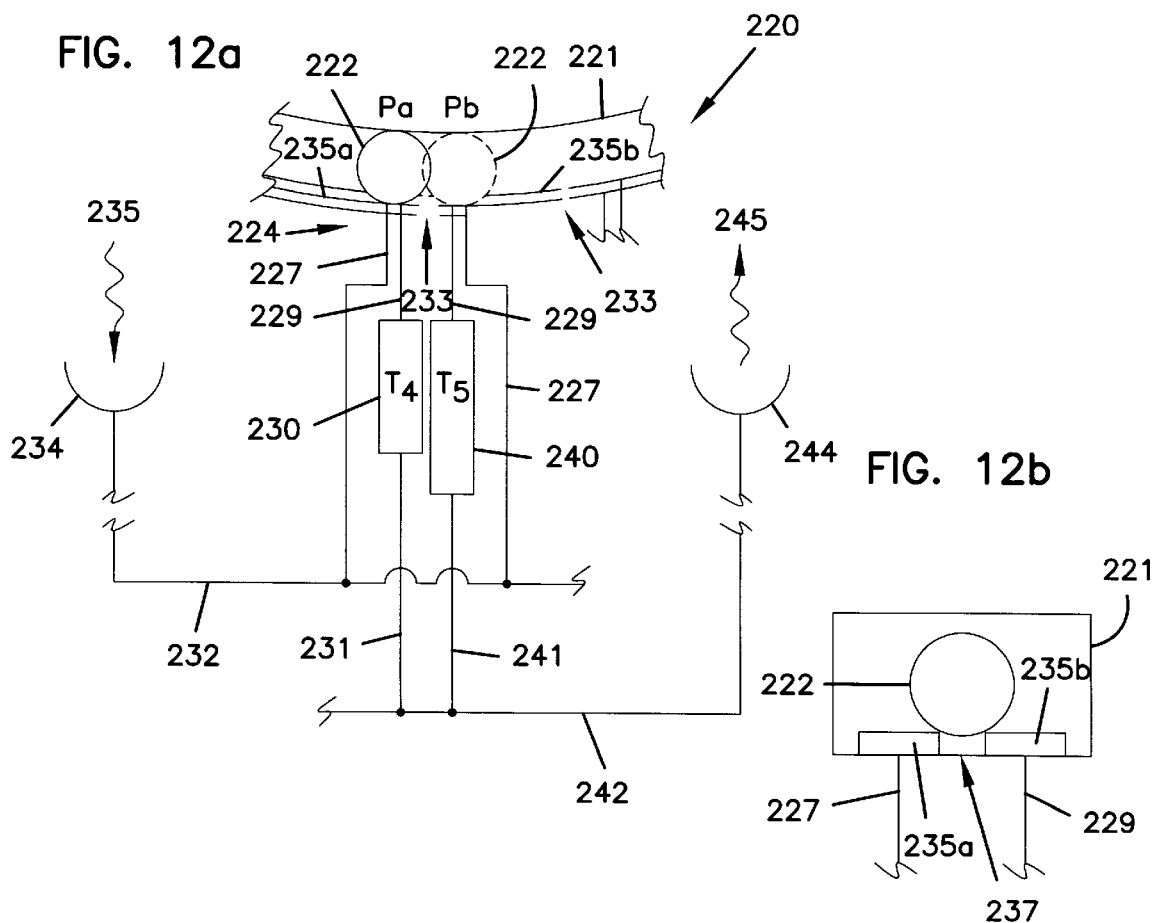
FIG. 12a
FIG. 12b

APPARATUS AND METHOD FOR DETECTING AN UNDERGROUND STRUCTURE

This is a Continuation-in-Part of U.S. patent application Ser. No. 08/587,832, filed Jan. 11, 1996, now U.S. Pat. No. 5,720,354.

FIELD OF THE INVENTION

The present invention relates generally to the field of underground object detection systems and, more particularly, to an apparatus and method for acquiring data concerning the location of an underground structure and for determining an orientation of the underground structure.

BACKGROUND OF THE INVENTION

Utility lines for water, electricity, gas, telephone, and cable television are often run underground for reasons of safety and aesthetics. Storage tanks and vessels are also situated underground for similar reasons. It is often necessary to access such underground utilities and tanks for purposes of performing maintenance and for expanding such utilities and tank storage capacities. In order to perform a safe and cost effective excavation of an underground utility or storage tank site, the ability to reliably detect the presence and depth of such underground structures is of considerable value.

Various techniques for detecting the presence of an underground structure have been developed that involve the use of ground penetrating radar (GPR). Ground penetrating radar is a sensitive technique for detecting even small changes in the subsurface dielectric constant. Consequently, the images generated by GPR systems contain a great amount of detail, much of it either unwanted or unnecessary for purposes of surveying for underground objects. A major difficulty, therefore, in using GPR for locating an underground structure concerns the present inability in the art to correctly distinguish return signals reflected by an underground object of interest from all of the signals generated by other subsurface features, such signals collectively being referred to as clutter. Moreover, depending on the depth of the underground object and the propagation characteristics, of the intervening ground medium, the return signal from the underground object can be extremely weak relative to the clutter signal. Consequently, the return signal reflected by the underground object may be misinterpreted or undetected.

Moreover, conventional GPR detection techniques have limited capability and accuracy when attempting to determine the depth and orientation of the underground structure. These limitations can have severe consequences when attempting to access underground utilities and storage vessels, such as fuel/chemical storage tanks, for example, using heavy excavation or boring equipment, in which case the location of the underground structure must be accurately determined in order to avoid accidental disturbance of, or damage to, the underground structure.

There exists a need for an apparatus that can reliably locate an underground structure with higher accuracy than is currently attainable given the present state of the technology.

SUMMARY OF THE INVENTION

The present invention is an apparatus and method for locating an underground object or structure by employment of a radar-like probe and detection technique. The underground structure is provided with a device which generates a specific signature signal in response to a probe signal transmitted from above the ground. Cooperative action between the probe signal transmitter at ground level and the signature signal generating device provided on, or proximate to, the underground object provides for accurate detection of the subsurface object, despite the presence of a large background noise signal. The depth and, if desired, orientation of the underground object may also be determined using the signature signal generated by the signature signal generating device mounted on, or proximate to, the underground object. Orientation information may be encoded on the signature signal or transmitted as an information signal separate from the signature signal. The probe signal may be microwave or acoustic.

The signature signal produced by the signature signal generating device provided on the underground object may be generated either passively or actively. Further, the signature signal may be produced in a manner which differs from the probe signal in one or more ways, including phase, frequency content, information content, or polarization, for example. Also, the signature signal generating device may produce both location and orientation information, without the need for a separate orientation detecting device. Alternatively, orientation and location information may be produced by independent orientation detection and signature signal generating devices.

In accordance with one embodiment, surveying the underground object site provides for the production of data associated with the characteristics of the ground medium subjected to the survey. Geophysical data may be used to assess the excavatability of the intervening ground between the probing and detection apparatus and the underground object.

BRIEF DESCRIPTION OF THE DRAWINGS

FIG. 11 is an illustration of an orientation detecting apparatus that, in accordance with one set of embodiments, includes one or more active components, and, in accordance with another set of embodiments, includes only passive components;

FIG. 12 is an illustration of a passive orientation detector that produces a signature signal indicative of both the location and orientation of the cooperative target;

DETAILED DESCRIPTION OF THE EMBODIMENTS

Figure 1:
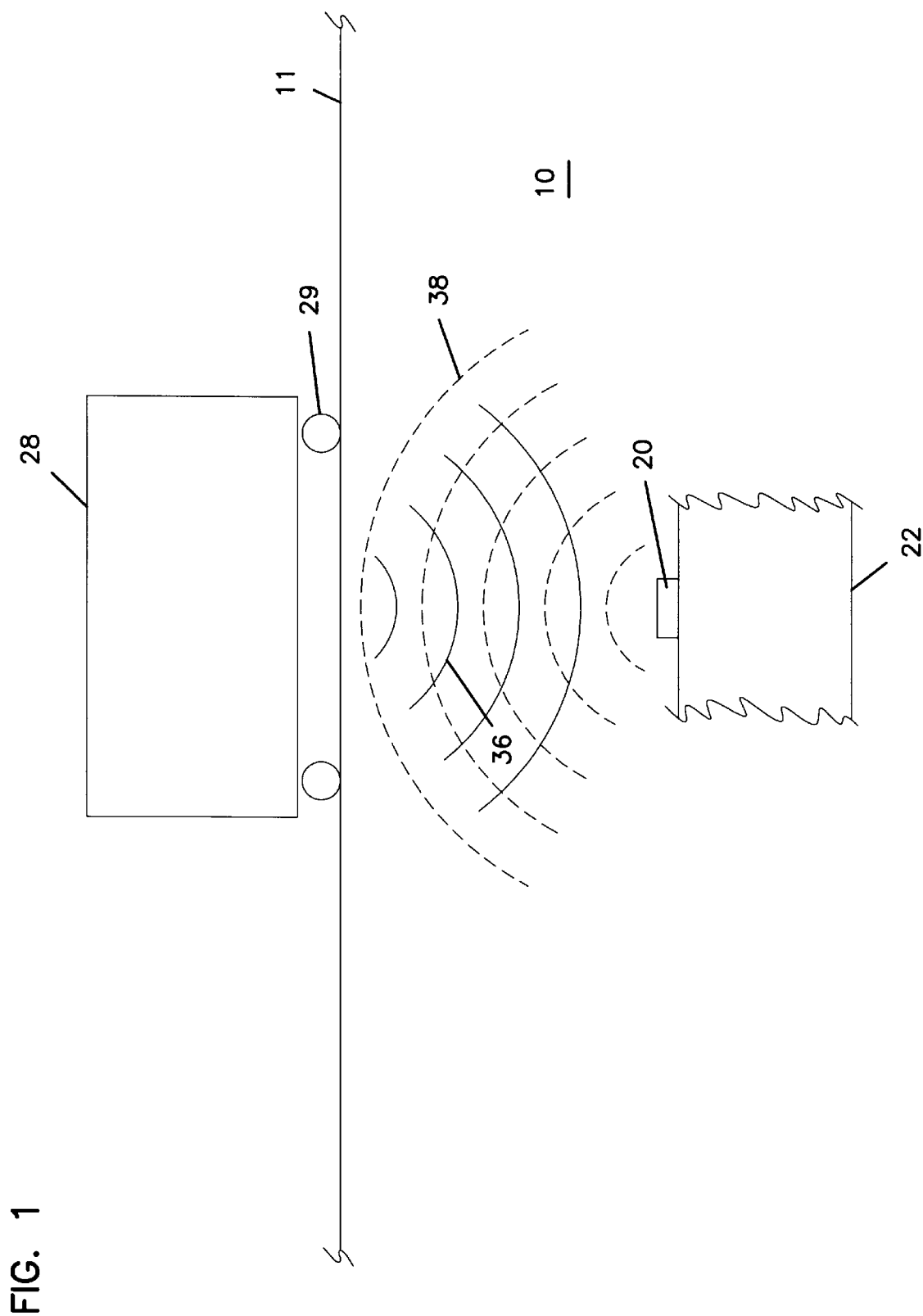
FIG. 1 is a side view of a probing and detection apparatus for locating an underground structure in accordance with an embodiment of the present invention.

Referring now to the figures and, more particularly, to FIG. 1, there is illustrated an embodiment of a system for detecting the presence of an underground structure and, more particularly, for detecting the location of the underground structure. FIG. 1 illustrates a cross-section through a portion of ground 10 within which an underground structure or object 22 is situated. The detection system includes an above-ground probing and detection unit 28 (PDU) and a below-ground cooperative target 20 mounted, or otherwise coupled, to the underground structure 22.

The PDU 28 and the target 20 operate in cooperation to provide reliable and accurate locating of an underground structure 22. In terms of general operation, the PDU 28 transmits a probe signal 36 into the ground 10 and detects return signals reflected from the ground medium and the underground structure 22. The return signals typically includes content from many different reflection sources, often rendering detection of the underground structure 22 unreliable or impossible using conventional techniques. Detecting an underground structure 22 is greatly enhanced by use of the cooperative target 20, which, in response to the probe signal 36, emits a signature signal that is readily distinguishable from the return signals reflected by the ground medium and the underground structure 22. As such, the presence and location of an underground structure 22 is readily and reliably detected by employing the probing and detection system and method of the present invention.

It is well known in the field of subsurface imaging that conventional underground imaging techniques, such as those that employ GPR, detect the presence of many types of underground obstructions and structures. It is also well known in the art that detecting underground structures and objects of interest is often made difficult or impossible due to the detection of return signals from many sources, collectively known as clutter, associated with other underground obstructions, structures, and varying ground medium characteristics, for example. The clutter signal represents background noise in the return signal above which a return signal of interest must be distinguished. Attempting to detect the presence of the underground structure 22 using a conventional approach often renders the underground structure 20 undetectable or indistinguishable from the background noise.

It is understood that the return signal from the underground structure 22 using conventional detection techniques may be weak relative to the clutter. In other words, the signal-to-clutter ratio in this case would be low, which reduces the ability to clearly detect the underground structure return signal. The probe and detection apparatus and method of the present invention advantageously provides for the production of a return signal from the cooperative target 22 mounted to the underground structure 22 having a characteristic signature which can be more easily distinguished from the clutter. As will be discussed in detail hereinbelow, the generation of a signature signal by the cooperative target 20 may be performed either passively or actively.

Figure 2:
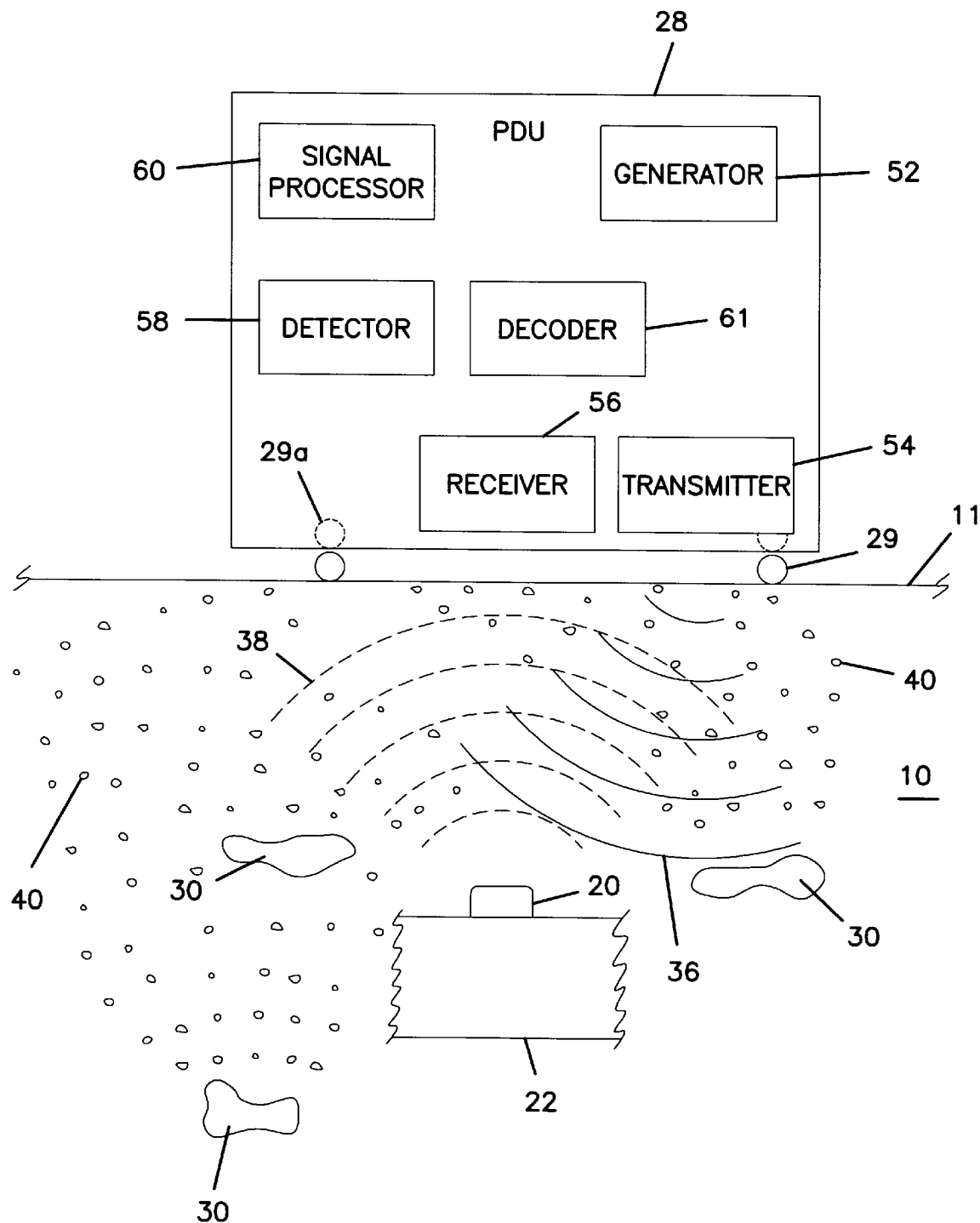
FIG. 2 is a block diagram of the probing and detection apparatus shown in FIG. 1.

Illustrated in FIGS. 1 and 2 is an embodiment of a system for detecting the location of an underground structure or object 22 in accordance with the present invention. The PDU 28 includes a generator 52 for generating a probe signal 36 which probes the ground 10. A transmitter 54 receives the probe signal 36 from the generator 52, which, in turn, transmits the probe signal 36 (shown as continuous lines) into the ground 10. In a first embodiment, the generator 52 is a microwave generator and the transmitter 54 is a microwave antenna for transmitting microwave probe signals. In an alternative embodiment, the generator 52 is an acoustic wave generator and produces acoustic waves, and the transmitter 54 is typically a probe placed into the ground 10 to ensure good mechanical contact for transmitting the acoustic waves into the ground 10. Wheels 29 are provided to enhance portability of the PDU 28, and may retract into the housing of the PDU 28 (shown as wheels 29a in phantom) to increase ground coupling between the ground and the transmitting and receiving elements of the PDU 28. It is noted that the components of the PDU 28 illustrated in FIG. 2 need not be contained within the same housing or supporting structure.

The probe signal 36 is transmitted by the PDU 28, propagates through the ground 10, and encounters subsurface obstructions, several of which are shown as obstructions 30, which scatter a return signal 40 (shown as dotted lines in FIG. 2) back to the PDU 28. A signature signal 38 (shown as dashed lines) is generated by the cooperative target 20 and received by the PDU 28.

The detection section of the PDU 28 includes a receiver 56, a detector 58, and a signal processor 60. The receiver 56 receives the return signals from the ground 10 and communicates the signals to the detector 58. The detector 58 converts the return signals into electrical signals which are subsequently analyzed by the signal processing unit 60. In the first embodiment described hereinabove in which the probe signal 36 constitutes a microwave signal, the receiver 56 typically includes an antenna or an array of antennas, and the detector 58 typically includes a detection diode. In another embodiment in which the probe signal 36 constitutes an acoustic wave, the receiver 56 typically includes a probe situated so as to make good mechanical contact with the ground 10, and the detector 58 includes a sound-to-electrical transducer, such as microphone. The signal processor 60 may include various preliminary components, such as a signal amplifier, filters, and an analog-to-digital convertor, followed by more complex circuitry for producing a two or three dimensional image of a subsurface volume which incorporates the various underground obstructions 30 and the underground structure 22.

The PDU 28 also contains a decoder 61 for decoding information signal content that may be encoded on the signature signal produced by the cooperative target 20. Orientation, pressure, and temperature information, for example, may be sensed by appropriate sensors provided in the cooperative target 20, such as a strain gauge for sensing pressure. Such information may be encoded on the signature signal, such as by modulating the signature signal with an information signal, or otherwise transmitted as part of, or separate from, the signature signal. When received by the receiver 56, an encoded signal 38 is decoded by the decoder 61 to extract the information signal content from the signature signal content.

Figure 3:
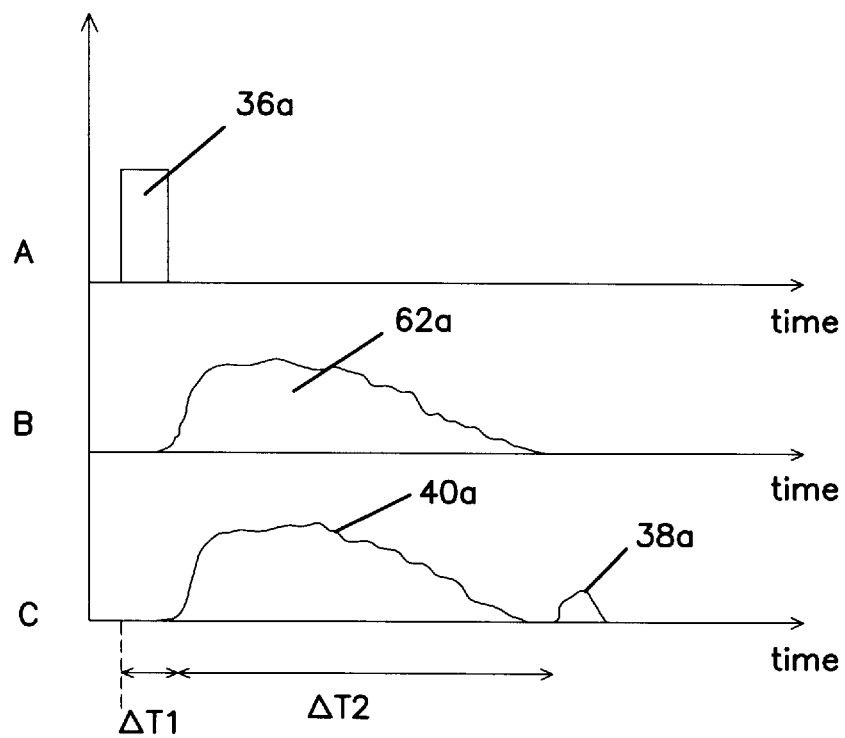
FIG. 3 is a graph depicting time domain signature signal generation.
Figure 4:
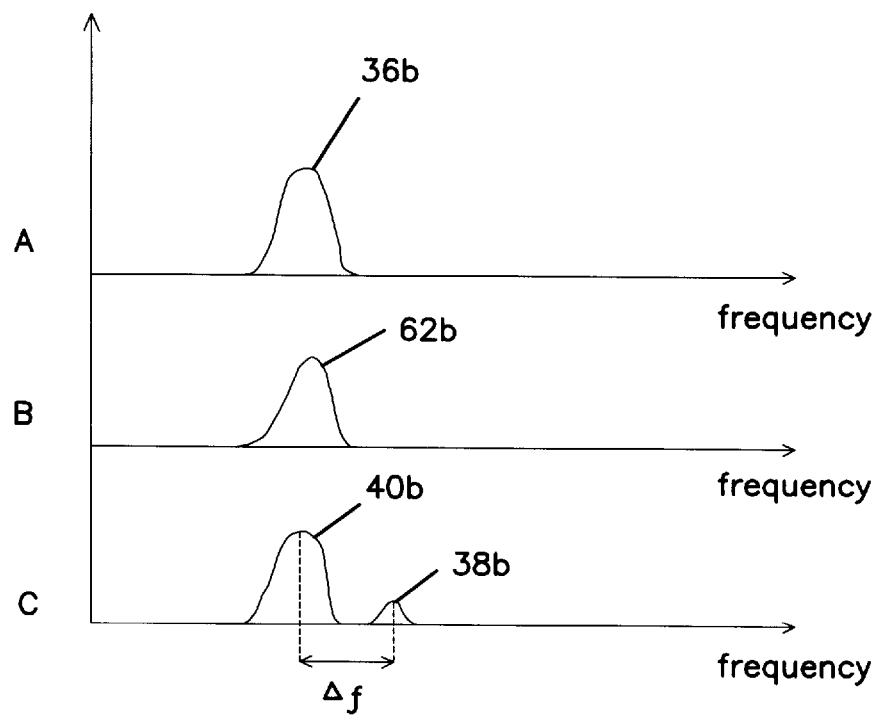
FIG. 4 is a graph depicting frequency domain signature signal generation.

Signature signal generation, in accordance with the embodiments of FIGS. 3 and 4, may be accomplished using temporal and frequency based techniques, respectively. FIG. 3 is an illustration depicting the generation and detection of an underground structure signature signal in the time domain. Line A shows the emission of a probe signal 36a as a function of signal character plotted against time. Line B shows a return signal 62a detected by the PDU 28 in the absence of any signature signal generation. The return signal 62a is depictive of a signal received by the PDU 28 at a time $\Delta T1$ after emission of the probe signal 36a, and is represented as a commixture of signals returned from the underground structure 22 and other scatterers. As previously discussed, a low signal-to-clutter ratio makes it very difficult to distinguish the return signal from the underground structure 22.

Line C illustrates an advantageous detection technique in which cooperation between the cooperative target 22, mounted to the underground structure 22, and the PDU 28 is employed to produce and transmit a signature signal at a certain time $\Delta T2$ following illumination with the probe signal 36a. In accordance with this detection scheme, the return signal 40a received from the scatterers is detected initially, and the signature signal 38a received from the underground structure 22 is detected after a delay of $\Delta T2$. The delay time $\Delta T2$ is established to be sufficiently long so that the signature signal produced by the cooperative target 20 is significantly more pronounced than the clutter signal at the time of detection. In this case, the signal-to-clutter ratio of the signature signal 38a is relatively high, thus enabling the signature signal 38a to be easily distinguished from the background clutter 40a.

FIG. 4 is an illustration depicting the detection of a cooperative target signature signal in the frequency domain. Line A illustrates the frequency band 36b of the probe signal as a function of signal strength plotted against frequency. Line B shows a frequency band 62b of a return signal received from the underground structure 22 in the absence of any cooperative signal generation. It can be seen that the return signals from the underground structure 22 and other scatterers 30 share a frequency band 62b similar to that of the probe signal 36b. Line C illustrates a case where cooperation is employed between the cooperative target 20 and the PDU 28 to produce and transmit a signature signal which has a frequency band 38b different from that of the scattered return signal 40b. The difference in frequency band, indicated as $\Delta f$, is sufficiently large to move the cooperative target signature signal out of, or at least partially beyond, the scattered signal frequency band 40b. Thus, the cooperative target signature signal can be detected with relative ease due to the increased signal-to-clutter ratio. It is noted that high pass, low pass, and notch filtering techniques, for example, or other filtering and signal processing methods may be employed to enhance cooperative target signature signal detection.

It is an important feature of the invention that the underground structure 22 be provided with a signature signal-generating apparatus, such as a cooperative target 20, which produces a signature signal in response to a probe signal transmitted by the PDU 28. If no such signature signal was produced by the generating apparatus, the PDU 28 would receive an echo from the underground structure 22 which would be very difficult to distinguish from the clutter with a high degree of certainty using conventional detecting techniques. The incorporation of a signature signal generating apparatus advantageously provides for the production of a unique signal by the underground structure 22 that is easily distinguishable from the clutter and has a relatively high signal-to-clutter ratio. As discussed briefly above, an active or passive approach is suitable for generating the cooperative target signature signal. It is understood that an active signature signal circuit is one in which the circuit used to generate the signature signal requires the application of electrical power from an external source, such as a battery, to make it operable. A passive circuit, in contrast, is one which does not utilize an external source of power. The source of energy for the electrical signals present in a passive circuit is the received probe signal itself.

In accordance with a passive approach, the cooperative target 20 does not include an active apparatus for generating or amplifying a signal, and is therefore generally less complex than an active approach since it does not require the presence of a permanent or replaceable power source or, in many cases, electronic circuitry. Alternatively, an active approach may be employed which has the advantage that it is more flexible and provides the opportunity to produce a wider range of signature response signals which may be more identifiable when encountering different types of ground medium. Further, an active approach reduces the complexity and cost of manufacturing the cooperative target 20, and may reduce the complexity and cost of the signature signal receiving apparatus.

Figure 5A:
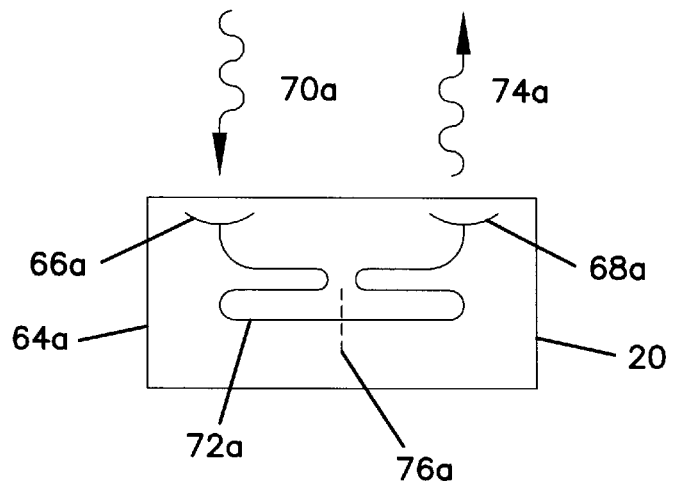
FIGS. 5a–5c show three embodiments for passive microwave signature signal generation.
Figure 5B:
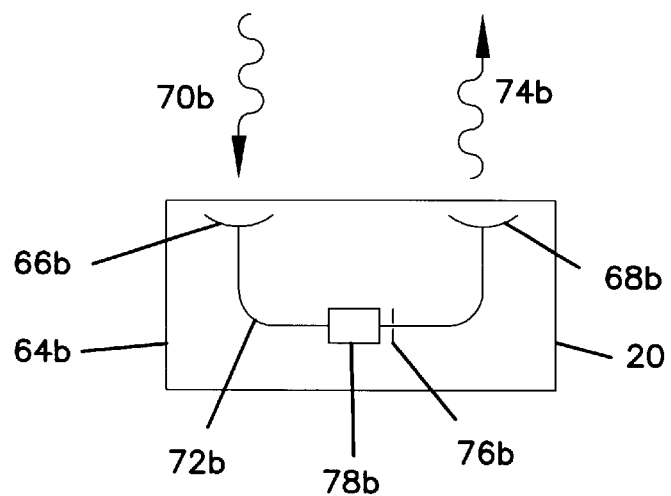
Figure 5C:
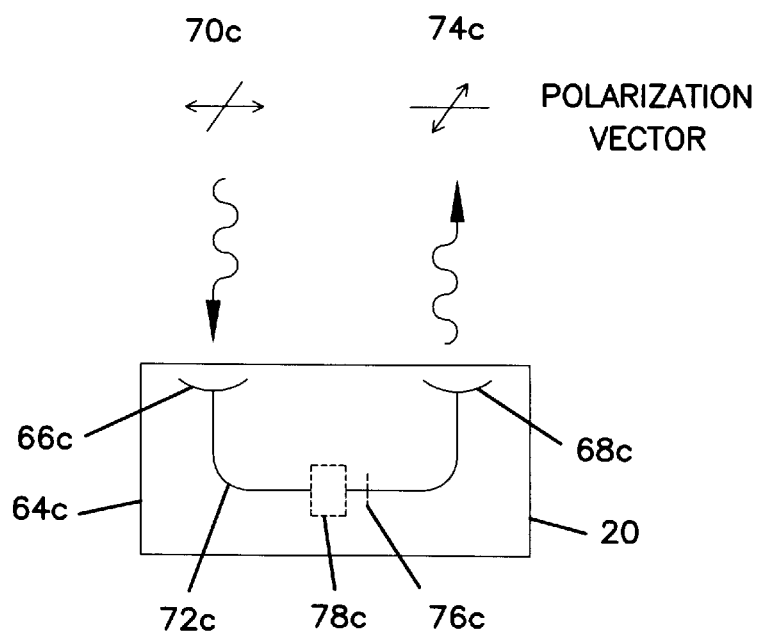

Three embodiments of passive signature signal generating apparatus associated with a microwave detection technique are illustrated in FIG. 5. Each of the embodiments shown in FIG. 5 includes a schematic of a cooperative target 20 including a microwave antenna and circuit components which are used to generate the signature signal. The three embodiments illustrated in FIGS. 5a, 5b, and 5c are directed toward the generation of the signature signal using a) the time domain, b) the frequency domain and c) cross-polarization, respectively.

In FIG. 5a, there is illustrated a cooperative target 20 which includes two antennae, a probe signal receive antenna 66a, and a signature signal transmit antenna 68a. For purposes of illustration, these antennae are illustrated as separate elements, but it is understood that microwave transmit/receive systems can operate using a single antenna for both reception and transmission. Two separate antennae are used in the illustration of this and the following embodiments in order to enhance the understanding of the invention and, as such, no limitation of the invention is to be inferred therefrom. The receive antenna 66a and the transmit antenna 68a in the physical embodiment of the signature signal generator will preferably be located inside the cooperative target 20 or on its surface in a conformal configuration. For antennae located entirely within the cooperative target 20, it is understood that at least a portion of the cooperative target housing is made of a non-metallic material, preferably a hard dielectric material, thus allowing passage of the microwaves through at least a portion of the cooperative target housing. A material suitable for this application is KEVLAR®.

Antennae that extend outside of the cooperative target housing may be covered by a protective non-metallic material. The antennae, in this configuration, may be made to conform to the housing contour, or disposed in recesses provided in the housing and covered with an epoxy material, for example.

The illustration of FIG. 5a shows the signature signal generation apparatus for a microwave detection system operating in the time domain. In accordance with this embodiment, a receive antenna 66a receives a probe signal 70a from the PDU 28, such as a short microwave burst lasting a few nanoseconds, for example. In order to distinguish a signature signal 74a from the clutter received by the PDU 28, the received probe signal 70a passes from the receive antenna 66a into a time-delaying waveguide 72a, preferably a co-axial cable, to a transmit antenna 68a. The signature signal 74a is then radiated from the transmit antenna 68a and received by the PDU 28. The use of the time-delay line, which preferably delays the response from the cooperative target 20 by about 10 nanoseconds, delays radiating the return signature signal 74a until after the clutter signal received by the PDU 28 has decreased in magnitude.

In accordance with another embodiment, a single antenna embodiment of the passive time domain signature generator could be implemented by cutting the waveguide at the point indicated by the dotted line 76a to form a termination. In this latter embodiment, the probe signal 70a propagates along the waveguide 72a until it is reflected by the termination located at the cut 76a, propagates back to the receive antenna 66a, and is transmitted back to the PDU 28. The termination could be implemented either as an electrical short, in which case the probe signal 70a would be inverted upon reflection, or as an open circuit, in which case the probe signal 70a would not be inverted upon reflection.

The introduction of a time delay to create the signature signal 74a makes the underground structure 22 appear deeper in the ground than it is in actuality. Since microwaves are heavily attenuated by the ground, ground penetrating radar systems have a typical effective depth range of about 10 feet when employing conventional detection techniques, beyond which point the signal returns are generally too heavily attenuated to be reliably detected. The production of a time delayed signature signal return 74a from the underground structure 64a artificially translates the depth of the underground structure 22 to an apparent depth in the range of 10 to 20 feet, a depth from which there is generally no other strong signal return, thus significantly enhancing the signal-to-clutter ratio of the detected signature signal 74a. The actual depth of the underground structure 22 may then be determined by factoring out the artificial depth component due to the known time delay associated with the cooperative target 20. It is believed that the signature signal generated by a cooperative target 20 may be detectable at actual depths on the order of 100 feet. It is further believed that a signature signal generated by an active device will generally be stronger, and therefore more detectable, than a signature signal produced by a passive device.

The illustration of FIG. 5b depicts a signature signal generating apparatus for a microwave detection system operating in the frequency domain. In accordance with this embodiment, a receive antenna 66b, provided in or on the cooperative target 20, receives a microwave probe signal 70b from the PDU 28. The probe signal 70b is preferably a microwave burst, lasting for several microseconds, which is centered on a given frequency, f, and has a bandwidth of Δf1, where Δf1/f is typically less than one percent. In order to shift a return signature signal 74b out of the frequency regime associated with the clutter received by the PDU 28, the received probe signal 70b propagates from the receive antenna 66b along a waveguide 72b into a nonlinear device 78b, preferably a diode, which generates harmonic signals, such as second and third harmonics, from an original signal.

The harmonic signal is then radiated from a transmit antenna 68b as the signature signal 74b and is received by the PDU 28. The PDU 28 is tuned to detect a harmonic frequency of the probe signal 70b. For a probe signal 70b of 100 MHz, for example, a second harmonic detector 58 would be tuned to 200 MHz. Generally, scatterers are linear in their response behavior and generate a clutter signal only at a frequency equal to that of the probe signal 70b. Since there is generally no other source of the harmonic frequency present, the signal-to-clutter ratio of the signature signal 74b at the harmonic frequency is relatively high. In a manner similar to that discussed hereinabove with respect to the passive time domain embodiment, the passive frequency domain embodiment may be implemented using a single antenna by cutting the waveguide at the point indicated by the dotted line 76b to form a termination. In accordance with this latter embodiment, the probe signal 70b would propagate along the waveguide 72b, through the nonlinear element 78b, reflect at the termination 76b, propagate back through the nonlinear element 78b, propagate back to the receive antenna 66b, and be transmitted back to the PDU 28. The polarity of the reflection would be determined by the nature of the termination, as discussed hereinabove.

The illustration of FIG. 5c depicts signature signal generation for a microwave detection system operating in a cross-polarization mode. In accordance with this embodiment, the PDU 28 generates a probe signal 70c of a specific linear polarity which is then transmitted into the ground. The clutter signal is made up of signal returns from scatterers which, in general, maintain the same polarization as that of the probe signal 70c. Thus, the clutter signal has essentially the same polarization as the probe signal 70c. A signature signal 74c is generated in the cooperative target 20 by receiving the polarized probe signal 70c in a receive antenna 66c, propagating the signal through a waveguide 72c to a transmit antenna 68c, and transmitting the signature signal 74c back to the PDU 28. The transmit antenna 68c is oriented so that the polarization of the radiated signature signal 74c is orthogonal to that of the received probe signal 70c. The PDU 28 may also be configured to preferentially receive a signal whose polarization is orthogonal to that of the probe signal 70c. As such, the receiver 56 preferentially detects the signature signal 74c over the clutter signal, thus improving the signature signal-to-clutter ratio.

In a manner similar to that discussed hereinabove with respect to the passive time and frequency domain embodiments, the cross-polarization mode embodiment may be implemented using a single antenna by cutting the waveguide at the point indicated by the dotted line 76c to form a termination and inserting a polarization mixer 78c which alters the polarization of the wave passing therethrough. In this latter embodiment, the probe signal would propagate along the waveguide 72c, through the polarization mixer 78c, reflect at the termination 76c, propagate back through the polarization mixer 78c, propagate back to the receive antenna 66c and be transmitted back to the PDU 28. The polarity of the reflection may be determined by the nature of the termination, as discussed previously hereinabove. It is understood that an antenna employed in the single antenna embodiment would be required to have efficient radiation characteristics for orthogonal polarizations. It is further understood that the cross-polarization embodiment may employ circularly or elliptically polarized microwave radiation. It is also understood that the cross-polarization embodiment may be used in concert with either the passive time domain or passive frequency domain signature generation embodiments described previously with reference to FIGS. 5a and 5b in order to further enhance the signal-to-clutter ratio of the detected signature signal.

Referring now to FIG. 6, active signature signal generation embodiments will be described. FIG. 6a illustrates an embodiment of active time domain signature signal generation suitable for incorporation in a cooperative target 20. The embodiment illustrated shows a probe signal 82a being received by a receive antenna 84a which is coupled to a delay-line waveguide 86a. An amplifier 88a is located at a point along the waveguide 86a, and amplifies the probe signal 82a as it propagates along the waveguide 86a. The amplified probe signal continues along the delay-line waveguide 86a to the transmit antenna 90a which, in turn, transmits the signature signal 92a back to the PDU 28. FIG. 6b illustrates an alternative embodiment of the active time domain signature generator which incorporates a triggerable delay circuit for producing the time-delay, rather than propagating a signal along a length of time-delay waveguide. The embodiment illustrated shows a probe signal 82b being received by a receive antenna 84b coupled to a waveguide 86b. A triggerable delay circuit 88b is located at a point along the waveguide 86b. The triggerable delay circuit 88b operates in the following fashion. The triggerable delay circuit 88b is triggered by the probe signal 82b which, upon initial detection of the probe signal 82b, initiates an internal timer circuit. Once the timer circuit has reached a predetermined delay time, preferably in the range 1–20 nanoseconds, the timer circuit generates an output signal from the triggerable delay circuit 88b which is used as a signature signal 92b. The signature signal 92b propagates along the waveguide 86b to a transmit antenna 90b which then transmits the signature signal 92b to the PDU 28.

Figure 6A:
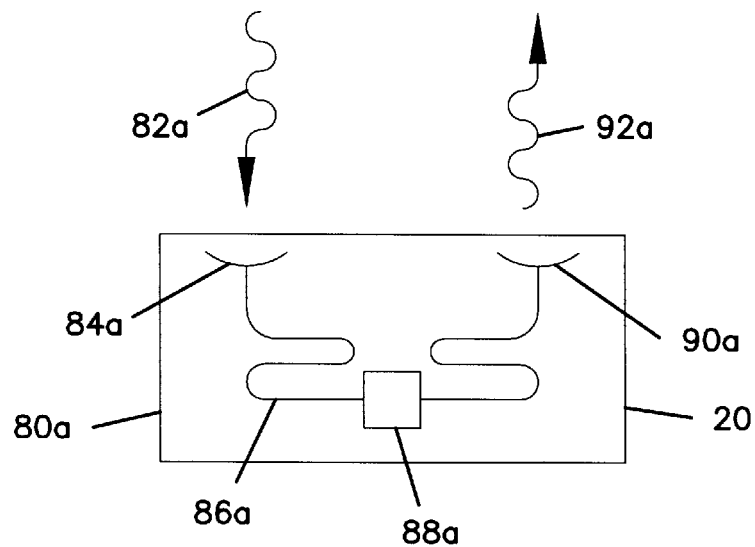
FIGS. 6a–6d show four embodiments for active microwave signature signal generation.
Figure 6B:
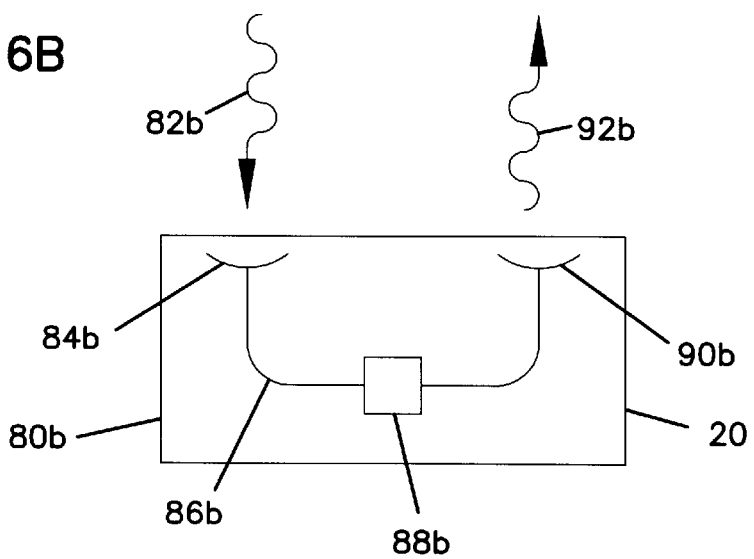
Figure 6C:
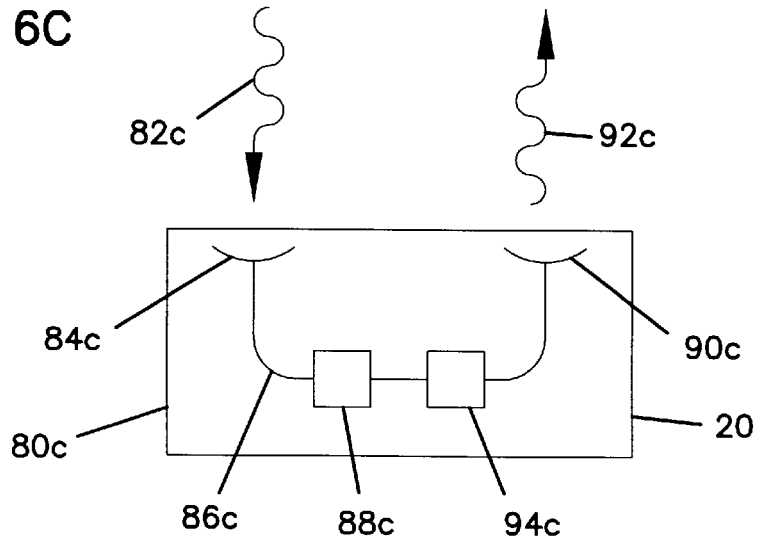

FIG. 6c illustrates an embodiment of an active frequency domain signature generator suitable for incorporation in a cooperative target 20. The embodiment illustrated shows a probe signal 82c being received by a receive antenna 84c coupled to a waveguide 86c and a nonlinear element 88c. The frequency-shifted signal generated by the nonlinear element 88c is then passed through an amplifier 94c before being passed to the transmit antenna 90c, which transmits the signature signal 92c to the PDU 28. The amplifier 94c may also include a filtering circuit to produce a filtered signature signal at the output of the amplifier 94c. An advantage to using an active frequency domain signature signal generation embodiment over a passive frequency domain signature signal generation embodiment is that the active embodiment produces a stronger signature signal which is more easily detected.

In a second embodiment of the active frequency domain signature signal generator, generally illustrated in FIG. 6c, a probe signal 82c passes through the amplifier 94c prior to reaching the nonlinear element 88c. An advantage of this alternative embodiment is that, since the amplification process may take place at a lower frequency, the amplifier may be less expensive to implement.

Figure 6D:
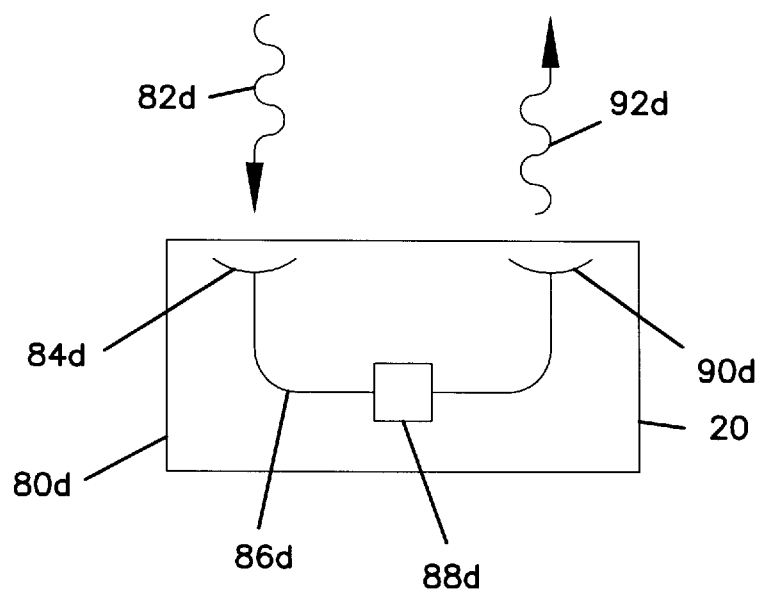

A third embodiment of an active frequency domain signature generator adapted for use in a cooperative target 20 is illustrated in FIG. 6d. FIG. 6d shows a receive antenna 84d coupled through use of a waveguide 86d to a frequency shifter 88d and a transmit antenna 90d. The frequency shifter 88d is a device which produces an output signal 92d having a frequency of f2, which is different from the frequency, f1, of an input signal 82d by an offset Δf, where f2=f1+Δf. In accordance with this embodiment, Δf is preferably larger than one half of the bandwidth of the probe signal 82d, typically on the order of 1 MHz. The frequency shifter 88d produces a frequency shift sufficient to move the signature signal 92d out of, or at least partially beyond, the frequency band of the clutter signal, thereby increasing the signal-to-clutter of the detected signature signal 92d. For purposes of describing these embodiments, the term signature signal embraces all generated return signals from the cooperative target 20 other than those solely due to the natural reflection of the probe signal off of the underground structure 22.

Figure 7A:
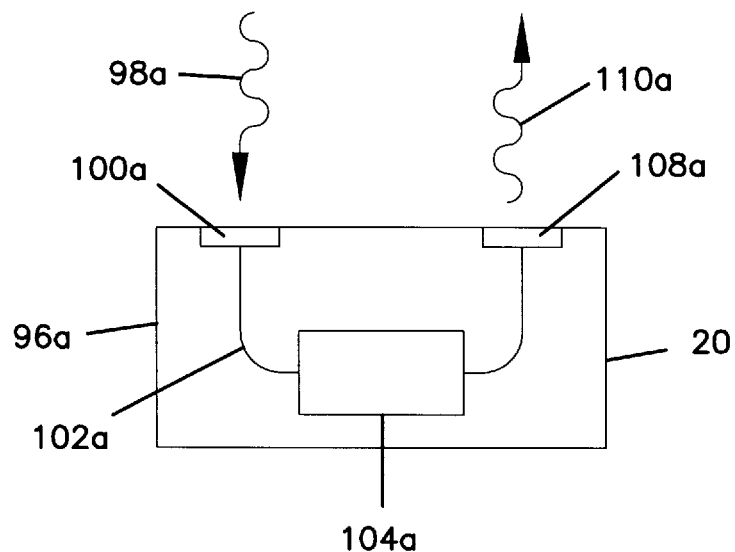
FIGS. 7a–7b show two embodiments for active acoustic signature signal generation.

FIG. 7 illustrates an embodiment of a signature signal generator adapted for use in a cooperative target 20 where the probe signal is an acoustic signal. In an acoustic time-domain embodiment, as illustrated in FIG. 7a, an acoustic probe signal 98a, preferably an acoustic impulse, is received and detected by an acoustic receiver 100a mounted on the inner wall 96a of the cooperative target 20. The acoustic receiver 100a transmits a trigger signal along a trigger line 102a to a delay pulse generator 104a. After being triggered, the delay pulse generator 104a generates a signature pulse following a triggered delay. The signature pulse is passed along the transmitting line 106a to an acoustic transmitter 108a, also mounted on the inner wall 96a of the cooperative target 20. The acoustic transmitter 108a then transmits an acoustic signature signal 110a through the ground for detection by the PDU 28.

Figure 7B:
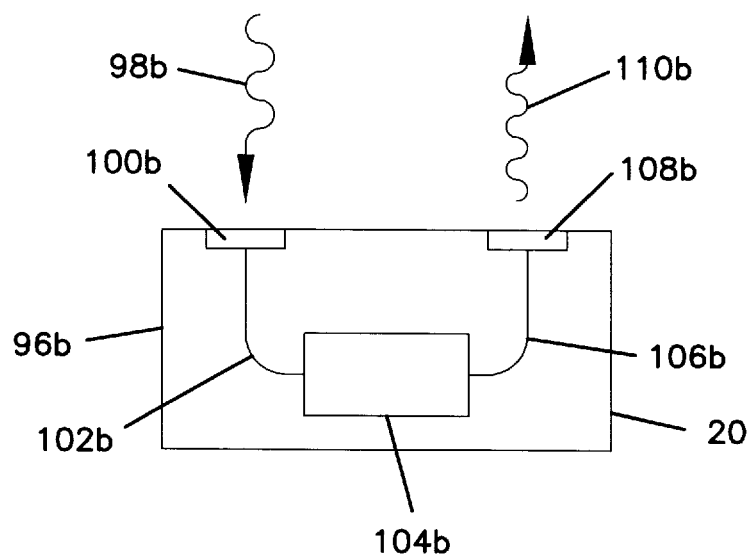

In accordance with an acoustic frequency-domain embodiment, as is illustrated in FIG. 7b, an acoustic probe signal 98b, preferably an acoustic pulse having a given acoustic frequency f3, is received and detected by an acoustic receiver 100b mounted on the inner wall 96b of the cooperative target 20. The acoustic receiver 100b transmits an input electrical signal corresponding to the received acoustic signal 98b at a frequency f3 along a receive line 102b to a frequency shifter 104b. The frequency shifter 104b generates an output electrical signal having a frequency that is shifted by an amount Δf3 relative to the frequency of the input signal 98b. The output signal from the frequency shifter 104b is passed along a transmit line 106b to an acoustic transmitter 108b, also mounted on the inner wall 96b of the cooperative target 20. The acoustic transmitter 108b then transmits the frequency shifted acoustic signature signal 110b through the ground for detection by the PDU 28.

Figure 8:
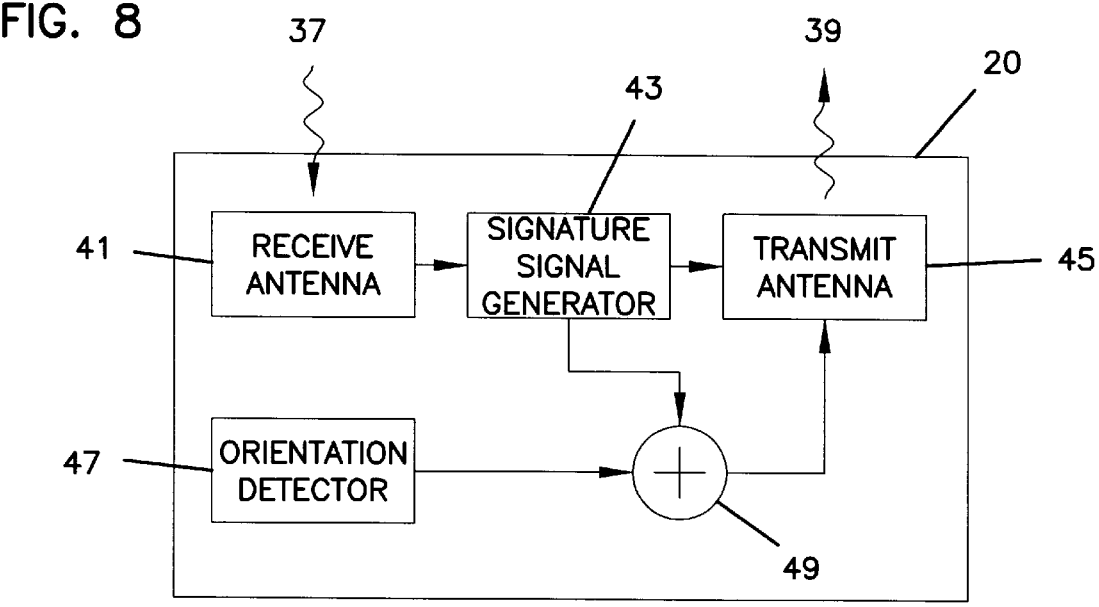
FIG. 8 shows an embodiment of a cooperative target incorporating a signature signal generator and an orientation detector.

In FIG. 8, there is illustrated in system block diagram form another apparatus for actively generating in a cooperative target 20 a signature signal that contains various types of information content. In one configuration, the signature signal generating apparatus of the cooperative target 20 includes a receive antenna 41, a signature signal generator 43, and a transmit antenna 45. In accordance with this configuration, a probe signal 37 produced by the PDU 28 is received by the receive antenna 41 and transmitted to a signature signal generator 43. The signature signal generator 43 alters the received probed signal 37 so as to produce a signature signal that, when transmitted by the transmit antenna 45, is readily distinguishable from other return and clutter signals received by the PDU 28. Alternatively, the signature signal generator 43, in response to the received probe signal 37, generates a signature signal different in character than the received probe signal 37. The signature signal transmitted by the transmit antenna 45 differs from the received probe signal 37 in one or more characteristics so as to be readily distinguishable from other return and clutter signals. By way of example, and as discussed in detail hereinabove, the signature signal produced by the signature signal generator 43 may differ in phase, frequency content, polarization, or information content with respect to other return and clutter signals received by the PDU 28.

Additionally, as is further illustrated in FIG. 8, the cooperative target 20 may include an orientation detector 47. The orientation detector 47 is a device capable of sensing an orientation of the cooperative target 20, and, when properly mounted to an underground structure 22, provides an indication of the orientation of the underground structure 22 as will be discussed in greater detail hereinbelow. The orientation detector 47 produces an orientation signal which is communicated to an encoder 49, such as a signal summing device, which encodes the orientation signal produced by the orientation detector 47 on the signature signal produced by the signature signal generator 43.

The encoded signature signal produced at the output of the encoder 49 is communicated to the transmit antenna 45 which, in turn, transmits the encoded signature signal 39 to the PDU 28. Various known techniques for encoding the orientation signal on the signature signal may be implemented by the encoder 49, such as by modulating the signature signal with the orientation signal. It is noted that other sensors may be included within the apparatus illustrated in FIG. 8 such as, for example, a temperature sensor or a pressure sensor. The outputs of such sensors may be transmitted to the encoder 49 and similarly encoded on the signature signal for transmission to the PDU 28 or, alternatively, may be transmitted as an information signal independent from the signature signal.

Figure 9:
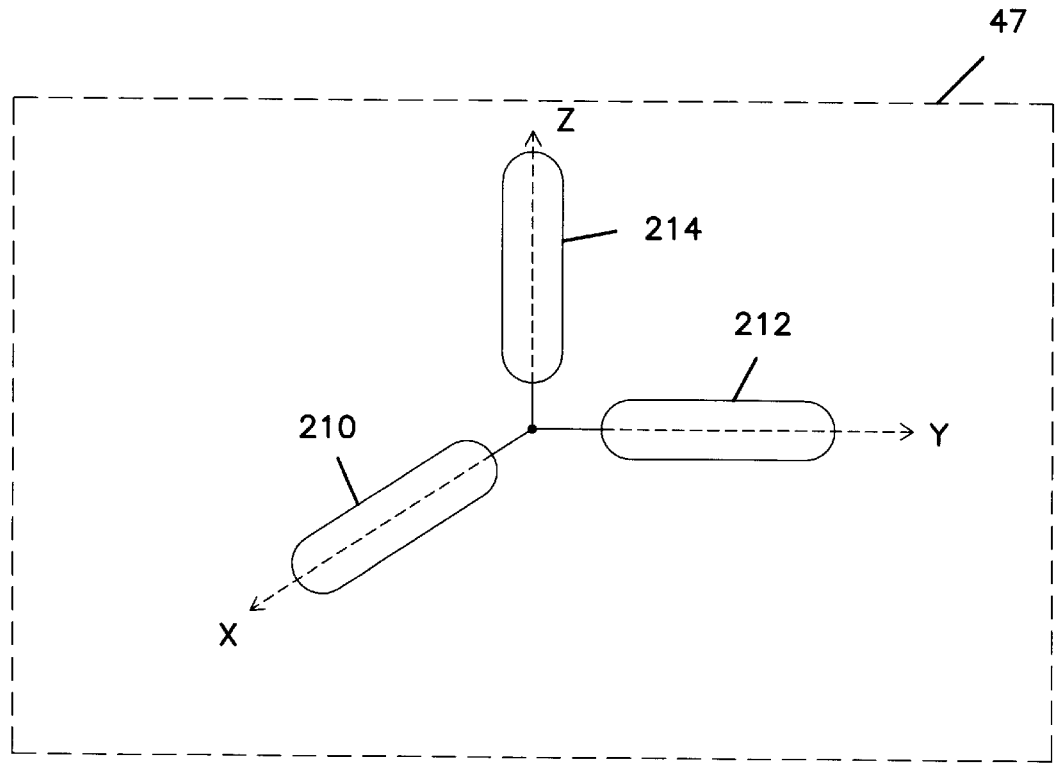
FIG. 9 is an illustration of an orientation detector for detecting an orientation of a cooperative target.

Referring to FIG. 9, there is illustrated an embodiment of an orientation detecting apparatus which may include up to three mutually orthogonally arranged orientation detectors. Each of the orientation detectors 210, 212 and 214 is aligned along the x axis, y axis, and z axis, respectively. In accordance with this embodiment, the orientation detector 210 detects changes in orientation with respect to the x axis, while the orientation detector 212 senses changes in orientation with respect to the y axis. Similarly, the orientation detector 214 detects changes in orientation with respect to the z axis. Given this arrangement, changes in pitch, yaw, and roll may be detected when the cooperative target 20 is subject to positional changes. It is noted that a single orientation detector, such as detector 210, may be used to sense changes along a single axis, such as pitch changes, if multiple axis orientation changes need not be detected. Further, depending on the initial orientation of the cooperative target 20 when mounted to the underground structure 22, two orthogonally arranged orientation detectors, such as orientation detectors 210 and 212 aligned respectively along the x and y axes, may be sufficient to provide pitch, yaw and roll information.

Figure 10:
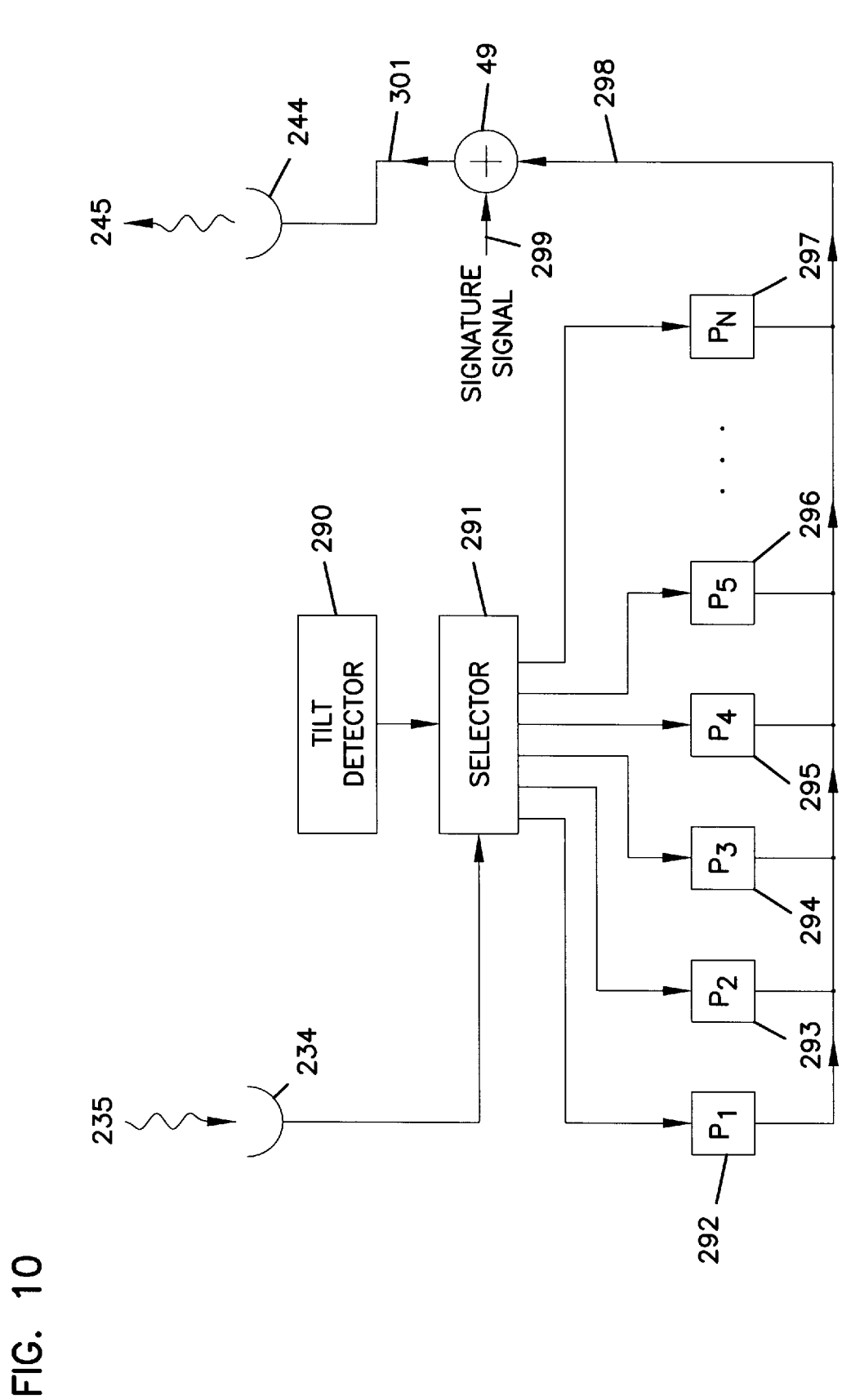
FIG. 10 is a block diagram of an orientation detector which, in accordance with one embodiment, detects an orientation of a cooperative target and produces an output indicative of such orientation, and, in accordance with another embodiment, produces an output signature signal that indicates both a location and an orientation of the cooperative target.

Referring now to FIG. 10, there is illustrated an embodiment of an apparatus for detecting an orientation of an underground cooperative target 20. In accordance with this embodiment, the cooperative target 20 includes a tilt detector 290 that detects movement of the cooperative target due to shifting of the underground structure 22 to which the cooperative target 20 is mounted. In most applications, it is believed that the underground structure 22 will be subject to a minimal degree of positional shifting over time. The cooperative target 20, in addition to producing a signature signal for purposes of determining cooperative target location, may include an orientation detector of the type illustrated in FIG. 10 for purposes of producing and orientation signal representative of an orientation of the cooperative target 20.

In one embodiment, as is illustrated in FIG. 8, the cooperative target 20 includes an orientation detecting apparatus, which produces an orientation signal, and a separate signature signal generator, which produces a signature signal. The signature signal and the orientation signal may be transmitted by the transmit antenna 45 of the cooperative target 20 as two separate information signals or, alternatively, as a composite signal which includes both the signature and orientation signals. Alternatively, the orientation detecting apparatus may produce a single signature signal that is indicative of both the location and the orientation of the cooperative target 20.

Referring in greater detail to FIG. 10, there is illustrated a tilt detector 290 coupled to a selector 291. The tilt detector 290, such as the tilt detector 210 illustrated in FIG. 9, detects tilting of the cooperative target 20 with respect to an initial alignment established at the time of cooperative target installation on the underground structure 22. The range of tilt angles detectable by the tilt detector 290 may be selected in accordance with the estimated amount of expected cooperative target tilting for a given application. For example, the tilt detector 290 may detect maximum tilt angles in the range of ±5° in one application, whereas, in another application, the tilt detector 290 may detect tilt angles in the range of ±10° to 20°. Similarly, tilt angles ranging between −1° to ±1° on the order of −1° or less may be detectable by an appropriately selected tilt detector 290. It is to be understood that the tilt detector 290, as well as other components illustrated in FIG. 10, may be active or passive components. Generally, however, it is believed that a passive system is desirable in applications in which the cooperative target 20 will not be subject to repeated access and maintenance, such as when used to detect positional shifting of the foundation of a building, such as that illustrated in FIG. 14, or a bridge, for example.

As is further illustrated in FIG. 10, a probe signal 235 is received by the receive antenna 234 which, in turn, communicates the probe signal 235 to a selector 291. The tilt detector 290 and selector 291 cooperate to select one of several orientation signal generators depending on the magnitude of tilting as detected by the tilt detector 290. In one embodiment, the probe signal 235 is coupled to each of the orientation signal generators $P_1$ 292 through $P_N$ 297, one of which is selectively activated by the tilt detector 290 which incorporates the function of the selector 291, such as the embodiment illustrated in FIG. 12. In another embodiment, the probe signal 235 is coupled to the selector 291 which activates one of the orientation signal generators $P_1$ 292 through $P_N$ 297 depending on the magnitude of tilting detected by the tilt detector 290.

By way of example, and in accordance with a passive component implementation, each of the orientation signal generators $P_1$ 292 through $P_N$ 297 represent individual transmission lines, each of which produces a unique time-delayed signature signal which, when transmitted by the transmit antenna 244, provides both location and orientation information when received by the PDU 28. As such, the orientation detection apparatus in accordance with this embodiment provides both location and orientation information and does not require a separate signature signal generator 43. In another embodiment, each of the orientation signal generators, such as orientation signal generator $P_3$ 294, produces a unique orientation signal which is transmitted to an encoder 49. A signature signal 299 produced by a signature signal generator 43 separate from the orientation detection apparatus may be input to the encoder 49, which, in turn, produces a composite signature signal 301 which includes both signature signal and orientation signal content. The composite signal 301 is then transmitted to the PDU 28 and decoded to extract the orientation signal content from the signature signal content.

As discussed previously, the range of tilt angles detectable by the tilt detector 290 and the resolution between tilt angle increments may vary depending on a particular application or use. By way of example, it is assumed that the tilt detector 290 is capable of detecting maximum tilt angles of ±4°. The selector 291 may select orientation signal generator $P_1$ 292 when the tilt detector 290 is at a level or null state (i.e., 0° tilt angle). When selected, orientation detector $P_1$ 292 generates a unique orientation signal which is indicative of an orientation of 0°. As previously discussed, the orientation signal may be combined with a signature signal produced by a separate signature signal generator 43 or, alternatively, may provide both signature signal and orientation signal information which is transmitted to the PDU 28.

In the event that the tilt detector 290 detects a positive 1° tilt angle change, orientation signal generator $P_2$ 293 is selected by the selector 291. The orientation signal generator $P_2$ 293 then produces an orientation signal that indicates a positive 1° tilt condition. Similarly, orientation signal generators $P_3$ 294, $P_4$ 295, and $P_5$ 296 may produce orientation signals representing detected tilt angle changes of positive 2°, 3°, and 4°, respectively. Negative tilt angles between 0° and −4° in 1° increments are preferably communicated to the PDU 28 by selection of appropriate orientation signal generators corresponding to the magnitude of negative tilting. It will be appreciated that the range and resolution between tilt angle increments may vary depending on a particular application.

Turning now to FIG. 11, there is illustrated an embodiment of an orientation detector suitable for use in both active and passive signal generating apparatuses. In one embodiment, a mercury sensor 220 may be constructed having a bent tube 221 within which a bead of mercury 222 moves as the tube 221 tilts within a plane defined by the axes 223 and 225. Pairs of electrical contacts, such as contacts 227 and 229, are distributed along the base of the tube 221. As the tube 221 tilts, the mercury bead 222 is displaced from an initial or null point, generally located at a minimum bend angle of the tube 221. As the bead 222 moves along the tube base, electrical contact is made between electrical contact pairs 227 and 229 distributed along the tube base. As the amount of tube tilting increases, the mercury bead 222 is displaced further from the null point, thus completing electrical circuit paths for contact pairs located at corresponding further distances from the null point. As such, the incremental change in tilt magnitude may be determined by detecting continuity in the contact pair over which the mercury bead 222 is situated.

In one embodiment, sixty-four of such contact pairs are provided along the base of the tube 221 to provide 64-bit tilt resolution information. An electrical circuit or logic (not shown) is coupled to the pairs of electrical contacts 227 and 229 which provides an output indicative of the magnitude of tube tilting, and thus an indication of the magnitude of the cooperative target orientation with respect to the plane defined by axes 223 and 225. It is appreciated that use of a mercury sensor 220 in accordance with this embodiment may require a power source. As such, this embodiment of an orientation detector is appropriate for use in active signature signal generating circuits. It is noted that the range of tilt angles detectable by the mercury sensor 220 is dependent on the bend angle a provided in the bent tube 221. The bend angle α, as well as the length of the tube 221, will also impact the detection resolution of mercury bead displacement within the tube 221.

In accordance with another embodiment of an orientation detector suitable for use in passive signature signal generating circuits, reference is made to FIGS. 11 and 12a–12b. The illustration of the apparatus depicted in FIG. 11 may be viewed in a context other than that previously described in connection with a mercury sensor embodiment. In particular, a metallic ball or other metallic object 222 is displaced within a tube 221 in response to tilting of the tube 221 within the plane defined by the axes 223 and 225. The movable contact 222 moves along a pair of contact rails 235a and 235b separated by a channel 237. The rails 235a and 235b include gaps 233 which separate one contact rail circuit from an adjacent contact rail circuit. As is illustrated in detail in FIGS. 12a–12b, each of the contact rail circuits is coupled to a pair of contacts 227 and 229 which, in turn, are coupled to a transmission line capable of producing a unique signature signal.

By way of example, and with particular reference to FIG. 12, movable contact 222 is shown moving within the tube 221 between a first position $P_a$ and a second position $P_b$ in response to tilting of the tube 221. When the movable contact 222 is at the position $P_a$, continuity is established between contact 227, contact rail 235a, movable contact 222, contact rail 235b, and contact 229. As such, the circuit path including the transmission line $T_4$ 230 is closed. A probe signal 235 produced by the PDU 28 is received by the receive antenna 234 which communicates the probe signal along an input waveguide 232 and through the circuit path defined by contact 227, rail contact 235a, movable contact 222, rail contact 235b, and contact 229. The received probe signal 235 transmitted to the time-delaying waveguide $T_4$ 230 produces a time-delayed signature signal which is communicated to an output waveguide 242 and to a transmit antenna 244. The signature signal produced by the waveguide $T_4$ 230 is then received by the PDU 28. The PDU 28 correlates the signature signal 245 with the selected signature signal waveguide, such as transmission line $T_4$ 230, and determines the magnitude of tube 221 tilting. Those skilled in the art will appreciate that various impedance matching techniques, such as use of quarter wavelength matching stubs and the like, may be employed to improve impedance matching within the waveguide pathways illustrated in FIGS. 12a–12b.

Generally, a GPR system has a time measurement capability which allows measuring of the time for a signal to travel from the transmitter, reflect off of a target, and return to the receiver. This is generally known as a time-of-flight technique, since it measures the duration of time during which the radar pulse is in flight between the transmitter and the receiver. Calculations can be used to convert this time value to a distance measurement that represents the depth of the target.

Figure 13:
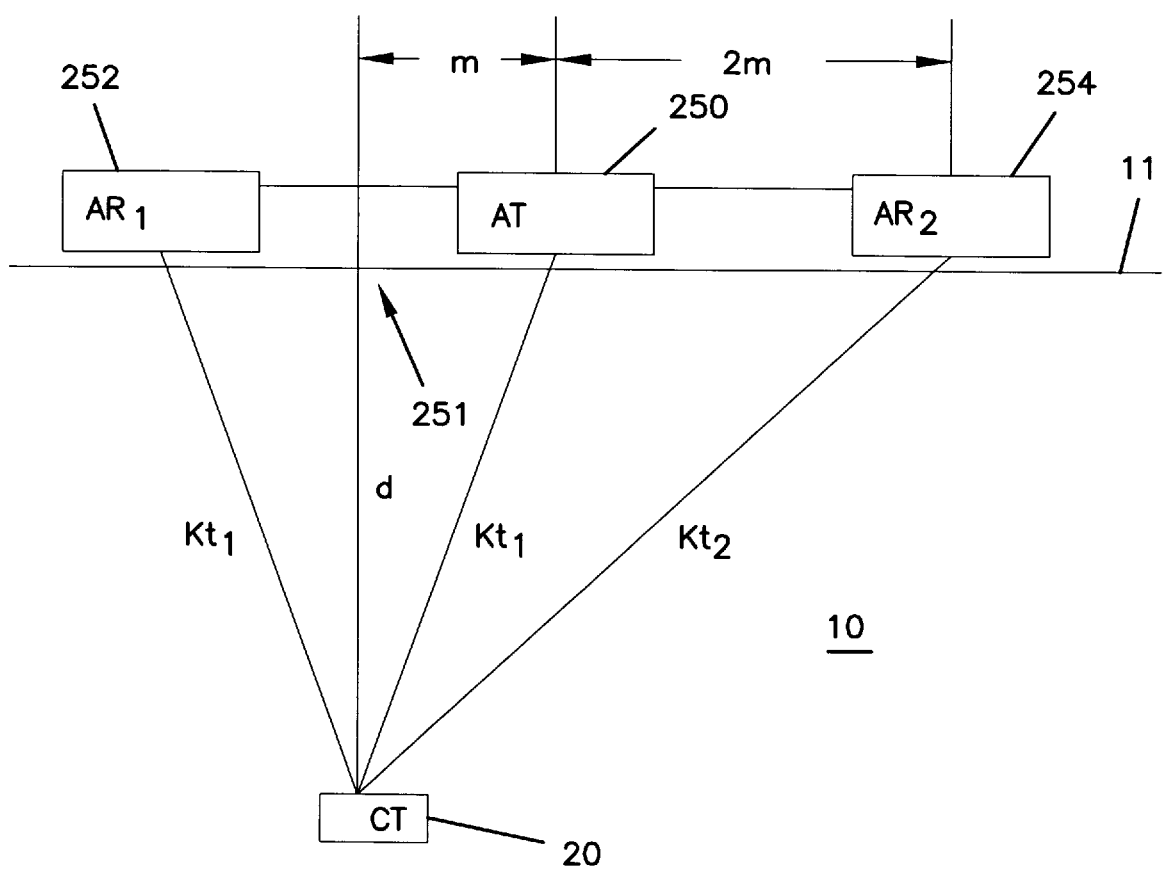
FIG. 13 is a diagram of a methodology for determining the depth of an underground cooperative target by use of at least two receiving antennas and a single transmitting antenna.

A methodology for detecting the depth of a cooperative target 20 in accordance with one embodiment is illustrated in FIG. 13. In accordance with this embodiment, the PDU 28 includes a transmitting antenna 250 and two receiving antennas, $AR_1$ 252 and $AR_2$ 254. Each of the receiving antennas $AR_1$ 252 and $AR_2$ 254 is situated a distance $2m$ from the transmitting antenna AT 250. It is assumed for purposes of this example that the propagation rate K through the ground medium of interest is locally constant. Although this assumption may introduce a degree of error with respect to actual or absolute depth, any such error is believed to be acceptable given the general application or use of the cooperative detection technique described herein. In other applications, absolute depth determinations may be desired. In such a case, the local propagation rate K, or dielectric constant, may be empirically derived, one such procedure being described hereinbelow.

The time-of-flight $t_1$ of the signal traveling between the cooperative target 20 and the receiving antenna AR, 252, and between the transmitting antenna 250 and the cooperative target 20 is determined when the cooperative target 20 is positioned below the centerline of the antennas $AR_1$ 252 and AT 250. The travel time of the signal traveling between the cooperative target 20 and the receiving antenna $AR_2$ 254 is indicated as the time $t_2$. The depth d of the cooperative target 20 may then be determined by application of the following equations:

$$d^2 = K^2(t_1^2) - m^2 \quad [1]$$

$$d^2 = K^2(t_2^2) - 9m^2 \quad [2]$$

$$K^2(t_2^2) - K^2(t_1^2) = 8m^2 \quad [3]$$

$$K^2(t_2^2 - t_1^2) = 8m^2 \quad [4]$$

$$K^2 = [8m^2/(t_2^2 - t_1^2)] \quad [5]$$

$$d^2 = [8m^2/(t_2^2 - t_1^2)](t_1^2) - m^2 \quad [6]$$

$$d = m[(8t_1^2/(t_2^2 - t_1^2)) - 1]^{1/2} \quad [7]$$

In accordance with an alternative approach for determining the depth d of a cooperative target 20, depth calculations are based upon field-determined values for characteristic soil properties, such as the dielectric constant and wave velocity through a particular soil type. A simplified empirical technique that can be used when calibrating the depth measurement capabilities of a particular GPR system involves coring a sample target, measuring its depth, and relating it to the number of nanoseconds it takes for a wave to propagate through the core sample.

For an embodiment of the invention which uses a microwave probe signal, a general relationship for calculating the depth or dielectric constant from the time of flight measurement is described by the following equations:

$$TE = TF - TD = \Sigma \frac{d_j \sqrt{\epsilon_j}}{c} \quad [8]$$

where, TE is an effective time-of-flight, which is the duration of time during which a probe signal or signature signal is travelling through the ground; TF is the measured time-of-flight; TD is the delay internal to the cooperative target between receiving the probe signal and transmitting the signature signal; $d_j$ is the thickness of the jth ground type above the cooperative target; $\epsilon_j$ is the average dielectric constant of the jth ground type at the microwave frequency; and c is the speed of light in a vacuum.

It is important to know the dielectric constant since it provides information related to the type of soil being characterized and its water content. Having determined the dielectric constant of a particular soil type, the depth of other cooperative targets located in similar soil types can be directly derived by application of the above-described equations.

Figure 14:
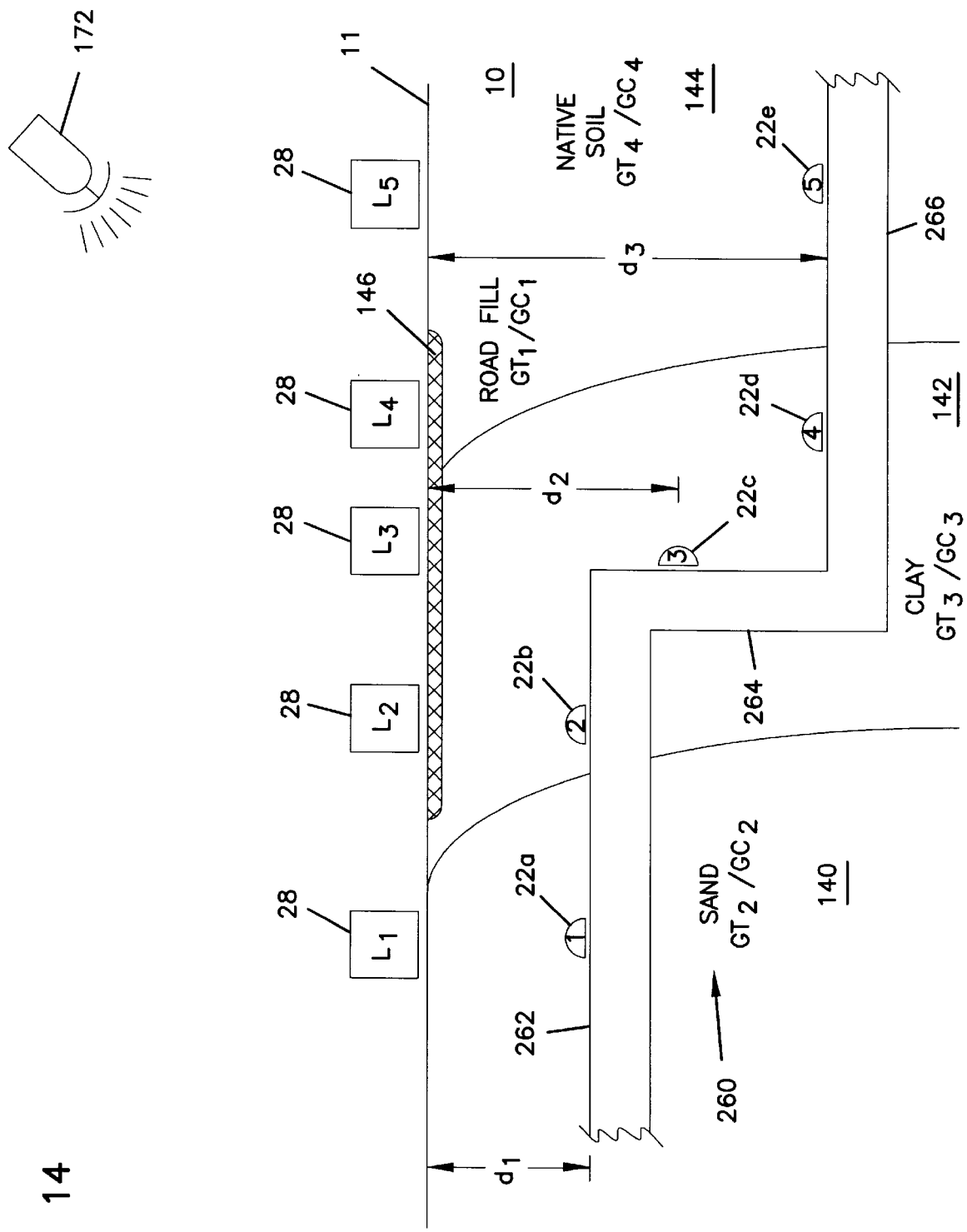
FIG. 14 is an illustration of a utility survey site and a probing and detection system for detecting multiple cooperative targets mounted at various locations along an underground utility.

In FIG. 14, there is illustrated an embodiment for using a detection system to locate an underground structure and to characterize the intervening medium between the underground structure and the PDU 28. In this figure, the PDU 28 is situated on the surface 11 of the ground 10 in an area in which a survey of the underground utility 260 is to be conducted. Information regarding the character of the intervening ground medium provides the opportunity to evaluate the excavation difficulty and the estimated cost of gaining access to the utility 260. As is shown in FIG. 14, the utility 260, such as a gas line, water line, communications conduit, or the like, is often installed over large distances and in varying soil conditions. Over the length of a particular utility 260, for example, a portion 262 of the utility 260 may be situated in sand 140, while another portion 264 may be situated in clay 142. Other portions of the utility 260, such as portion 266, may be installed in native soil 144. The difficulty and cost associated with gaining access to each of these utility portions is dependent in large part on the type of ground medium above a particular portion of interest.

As described previously, the ground 10 is made up of several different ground types, the examples as shown in FIG. 14 being sand (ground type 2 (GT2)) 140, clay (GT3) 142 and native soil (GT4) 144. The road is generally described by the portion denoted as road fill (GT1) 146. The PDU 28 is shown as being situated at several locations ($L_1$ through $L_5$) above the underground structure 260. At each of the survey locations, the PDU 28 is situated to transmit a probe signal into the ground in an attempt to locate the underground utility 260.

In the case of the PDU 28 positioned at location $L_2$, for example, the probe signal propagates through the road fill 146 and the clay 142. The cooperative target 22b, coupled to a portion 264 of the underground structure 260, in response, produces a signature signal which is detected and analyzed by the PDU 28. The analysis of the signature signal produced by cooperative target 22b provides a measure of the time-of-flight of the probe signal and the signature signal between the PDU 28 and the cooperative target 22b. The time-of-flight, as previously mentioned, is defined as a time duration measured by the PDU 28 between sending the probe signal and receiving the signature signal. The time-of-flight measured depends on a number of factors, including the depth of the underground structure, such as the portion 264 of the utility 260, the dielectric conditions of the intervening ground medium 146 and 142, and any delay involved in the generation of the signature signal within the cooperative target 22b. It is noted that, in general, knowledge of any two of these factors will yield the third from the time-of-flight measurement.

The depth of the underground utility portion 264 may be measured using the procedure described previously with respect to FIG. 13 and Equations [1]–[7]. For the case where the cooperative target 20d mounted to the underground structure 22 is located at the position shown in FIG. 14, for example, and with the assumption that the road fill 146 has a negligible thickness relative to the thickness of clay 142, the relationship of equation (8) simplifies to:

$$TE = TF - TD = \Sigma \frac{d_3 \sqrt{\epsilon_3}}{c} \quad [9]$$

where the subscript "3" refers to GT3. Direct measurement of the time-of-flight, TF, and the depth of the cooperative target 20d, $d_3$, along with the knowledge of any time delay, TD, will yield the average dielectric constant, $\epsilon_3$, of GT3. This characteristic can be denoted as GC3 (ground characteristic 3).

Also, the orientation of the cooperative target 22d may be determined using the above-described techniques. Further, the characteristics of the intervening ground medium between the PDU 28 and the cooperative target 20 may be determined in manner described herein and in U.S. Pat. No. 5,553,407, which is assigned to the assignee of the instant application, the contents of which are incorporated herein by reference. The PDU 28 may be moved to other positions on the ground surface 11 in order to detect the presence of other cooperative targets coupled to the utility 260.

Cooperation between the PDU 28 and each of the cooperative targets encountered along the survey route provides the opportunity to determine the depth of the utility 260, the relative orientation of each of the cooperative targets, and hence the applicable portion of the underground utility assuming an "as-installed" orientation is known, the geographical position of the detected utility portion, and the characteristics of the intervening ground medium between the PDU 28 and the underground utility 260 at the detected location. The continuous derivation of these data as the PDU 28 traverses a route which tracks the underground path of the utility 260 results in the production of an "as built" profile of the utility 260 and surrounding ground medium which may be recorded by the PDU 28.

It may be advantageous to make a precise recording of the geographical position of the underground structure 260. For example, and with reference to FIG. 15, it may be desirable to make a precise record of where utilities and storage tanks have been buried in order to properly plan future excavations or utility burial, and to avoid unintentional disruption of such utilities and storage vessels. Mapping an underground structure can be performed manually by relating the position data for the underground utility 260 collected by the PDU 28 to a base reference point, or may be performed electronically using a Geographic Recording System (GRS) 150. In one embodiment, a Geographic Recording System (GRS) 150 communicates with a central processor 152 of the PDU 28, relaying the precise location of the cooperative target 20 detected by the PDU 28. Since the PDU 28 also receives information regarding the position of the underground utility 260 relative to the PDU 28, the precise location of the underground utility 260 can be calculated and stored in a route mapping database 158.

The route mapping database 158 covers a given utility installation site, area, or region, such as a grid of city streets or a golf course under which various utility, communication, plumbing, and other conduits may be buried. The data stored in the route mapping database 158 may be subsequently used to produce a survey map that accurately specifies the location and depth of various utility conduits buried in a specific site. The data stored in the route mapping database 158 also includes information on ground characteristics which may be used to assess the excavation difficulty when access to a specific portion of the underground utility 260 is desired.

Figure 15:
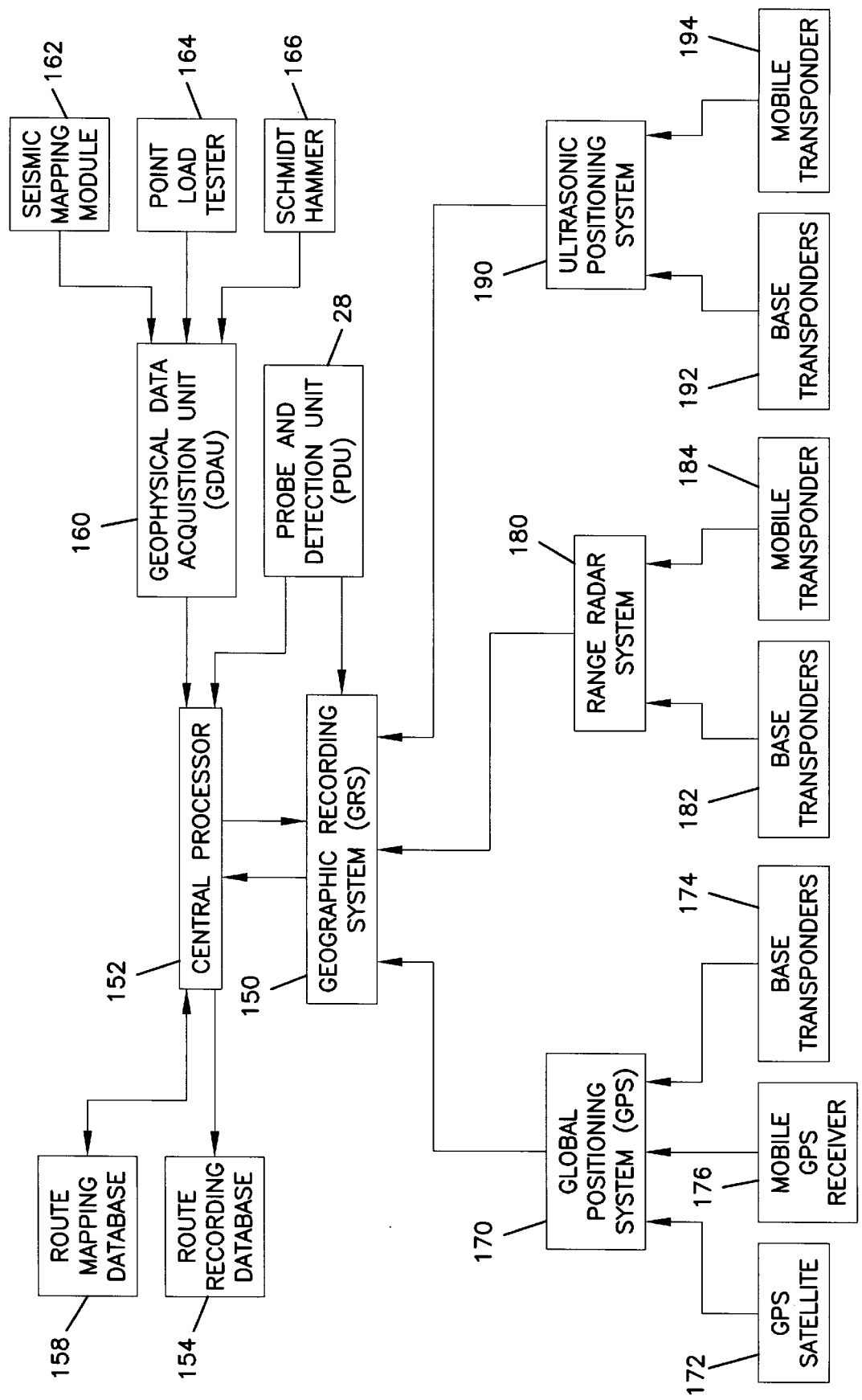
FIG. 15 illustrates in system block diagram form a system for detecting an underground cooperative target, for characterizing the intervening ground medium between the cooperative target and the system, and for determining the geographical position of the cooperative target.

In the embodiment illustrated in FIG. 15, a Global Positioning System (GPS) 170 is employed to provide position data for the GRS 150. In accordance with a U.S. Government project to deploy twenty-four communication satellites in three sets of orbits, termed the Global Positioning System (GPS), various signals transmitted from one or more GPS satellites may be used indirectly for purposes of determining positional displacement of a cooperative target 20 and an underground structure 22 proximate the cooperative target 20 relative to one or more known reference locations. It is generally understood that the U.S. Government GPS satellite system provides for a reserved, or protected, band and a civilian band. Generally, the protected band provides for high-precision positioning to a classified accuracy. The protected band, however, is generally reserved exclusively for military and other government purposes, and is modulated in such a manner as to render it virtually useless for civilian applications. The civilian band is modulated so as to significantly reduce the accuracy available, typically to the range of one hundred to three hundred feet.

The civilian GPS band, however, can be used indirectly in relatively high-accuracy applications by using one or more GPS signals in combination with one or more ground-based reference signal sources. By employing various known signal processing techniques, generally referred to as differential global positioning system (DGPS) signal processing techniques, positional accuracies on the order of centimeters are now achievable. The GRS 150 uses the signal produced by at least one GPS satellite 172, depicted in FIG. 14, in cooperation with signals produced by at least two base transponders 174, although the use of one base transponder 174 may be satisfactory in some applications. Various known methods for exploiting DGPS signals using one or more base transponders 174 together with a GPS satellite 172 signal and a mobile GPS receiver 176 coupled to the PDU 28 may be employed to accurately resolve the cooperative target 20 movement, and hence movement of the underground structure 22, relative to the base transponder 174 reference locations using a GPS satellite signal source.

In another embodiment, a ground-based positioning system may be employed using a range radar system 180. The range radar system 180 preferably includes a plurality of base radio frequency (RF) transponders 182 and a mobile transponder 184 mounted on the PDU 28. The base transponders 182 emit RF signals which are received by the mobile transponder 184. The mobile transponder 184 preferably includes a computer which calculates the range of the mobile transponder 184 relative to each of the base transponders 182 through various known radar techniques, and then calculates its position relative to all base transponders 182. The position data set gathered by the range radar system 180 is transmitted to the GRS 150 for storing in route recording database 154 or the route mapping database 158.

In yet another embodiment, an ultrasonic positioning system 190 may be employed together with base transponders 192 and a mobile transponder 194 coupled to the PDU 28. The base transponder 192 emits signals having a known clock timebase which are received by the mobile transponder 194. The mobile transponder 194 preferably includes a computer which calculates the range of the mobile transponder 194 relative to each of the base transponders 192 by referencing the clock speed of the source ultrasonic waves. The computer of the mobile transponder 194 also calculates the position of the mobile transponder 194 relative to all of the base transponders 192. It is to be understood that various other known ground-based and satellite-based positioning systems and techniques may be employed to accurately determine the location and route of the underground structure 22.

Another feature of the system for locating the underground structures concerns the acquisition and use of geophysical data at various survey locations along the utility route. A logically separate Geophysical Data Acquisition Unit 160 (GDAU), which may or may not be physically separate from the PDU 28, may provide for independent geophysical surveying and analysis. The GDAU 160 preferably includes a number of geophysical instruments which provide a physical characterization of the geology for a survey location. A seismic mapping module 162 includes an electronic device consisting of multiple geophysical pressure sensors. A network of these sensors is arranged in a specific orientation with respect to the portion of the utility subjected to the survey, with each sensor being situated so as to make direct contact with the ground. The network of sensors measures ground pressure waves produced by the cooperative target 20, if applicable, or some other acoustic source. Analysis of ground pressure waves received by the network of sensors provides a basis for determining the physical characteristics of the subsurface at the utility survey site and also for locating the utility 260. These data are preferably processed by the GDAU 160 prior to sending analyzed data to the central processor 152.

A point load tester 164 may be employed to determine the geophysical characteristics of the subsurface at the utility survey site. The point load tester 164 preferably employs a plurality of conical bits for the loading points which, in turn, are brought into contact with the ground to test the degree to which a particular subsurface can resist a calibrated level of loading. The data acquired by the point load tester 164 provide information corresponding to the geophysical mechanics of the soil under test. These data may also be transmitted to the GDAU 160.

The GDAU 160 may also include a Schmidt hammer 166 which is a geophysical instrument that measures the rebound hardness characteristics of a sampled subsurface geology. Other geophysical instruments may also be employed to measure the relative energy absorption characteristics of a rock mass, abrasivity, rock volume, rock quality, and other physical characteristics that together provide information regarding the relative difficulty associated with the intervening ground medium between the PDU 28 and the underground utility 260. The data acquired by the Schmidt hammer 166 are also stored in the GDAU 160.

Figure 16:
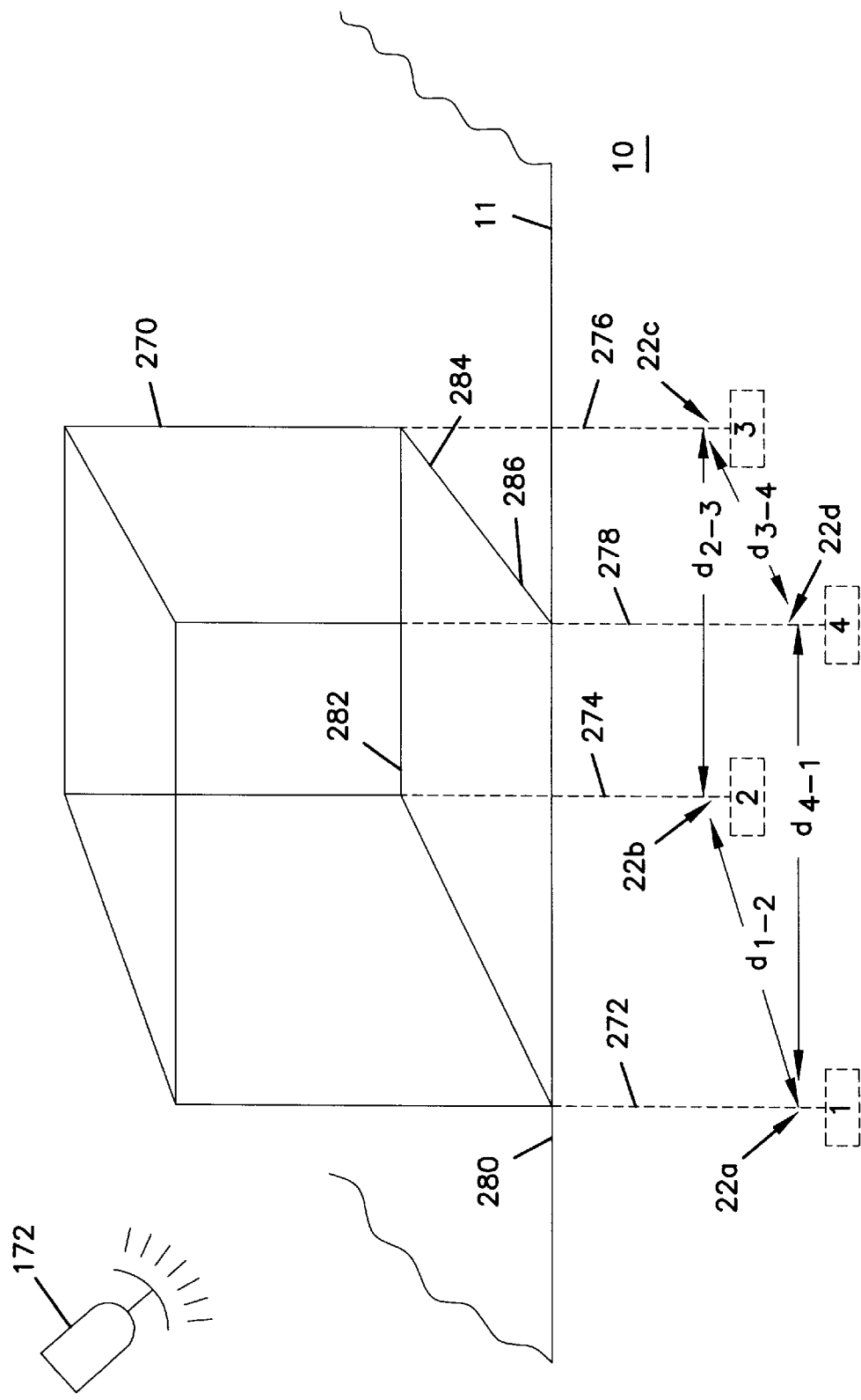
FIG. 16 is an illustration of a building including a plurality of cooperative targets mounted on a plurality of support members of a building for use in detecting positional shifting of the building support members.

It may be desirable, as is illustrated in FIG. 16, to employ multiple cooperative targets 20 distributed at different locations of an underground structure 22 in order to detect positional shifting of the structure over time. In geographical areas subject to earthquakes, ground erosion, and other conditions that have the effect of altering the composition and characteristics of the ground supporting an underground or above-ground structure, it may be desirable or imperative to ascertain whether the integrity of the foundation of such a structure has been altered or compromised. In FIG. 16, there is illustrated a building 270 including underground support members 272, 274, 276 and 278. Associated with each of the four support members is at least one cooperative target, such as cooperative target 22a mounted to support member 272.

In accordance with one embodiment, the PDU 28 is placed at a known geographic location proximate one of the four support members. The geographic location of the PDU 28 may be verified by use of a GPS positioning approach as discussed previously or other absolute positioning technique. As mentioned previously, positional accuracies on the order of centimeters are now achievable using such techniques. Location and depth readings, for example, are obtained at the verified PDU 28 location 280 using the cooperative target 22(a) mounted to the support member 272. This information may then be compared to previously obtained information at the test location 280. Position and depth information may be obtained at each of the other support members 274, 276, and 278 by moving the PDU 28 to the appropriate verified test locations 282, 284, and 286, respectively, and sensing the signature signal produced by corresponding cooperative targets 22(b), 22(c), and 22(d). Changes in the distance between two support members, such as the distance $d_{1-2}$ between support members 272 and 274, may be obtained by comparing the position information obtained from cooperative targets 22(a) and 22(b).

Orientation information may similarly be obtained at each of the cooperative target locations. It is believed that passive cooperative targets would be desirable in the application illustrated in FIG. 16, since access to the underground structure members may be difficult or prohibited after completing constructing the building 270. It is understood that the above-described methodology for detecting positional shifting of a building foundation is equally applicable to other structures, such as bridges, for example.

In accordance with another embodiment, it may be useful to identify the type of underground structure or object associated with a particular cooperative target 20. By way of example, it may be desirable to distinguish one type of utility conduit from another, such as a distinguishing gas line from a water line or telecommunications conduit. An identification or categorization scheme may be employed to identify the type of detected underground structure by the signature signal response of a cooperative target 20. A first range of signature signal frequencies, for example, may be associated with one type of underground structure, while a second range of signature signal frequencies may be reserved for another type of underground structure. A similar approach may be employed when using time domain signature signal recognition.

Also, the cooperative targets used in a given application may each produce a unique signature signal which may be used to associate a particular cooperative target with a specific utility or portion of a utility. It is understood that various identification tagging schemes using phase, frequency, polarization, encoded information, and other signature signal characteristics may be employed to uniquely identify the type or types of structures associated with particular cooperative targets.

It will, of course, be understood that various modifications and additions can be made to the preferred embodiments discussed hereinabove without departing from the scope or spirit of the present invention. Accordingly, the scope of the present invention should not be limited by the particular embodiments described above, but should be defined only by the claims set forth below and equivalents thereof.

What is claimed is:

1. A system for detecting an underground structure, comprising:

a probe signal generator, separate from the underground structure, to generate a probe signal;

a signature signal generator, provided on the underground structure, to produce a signature signal in response to the probe signal; and a detector to detect a location of the underground structure using the signature signal.

2. The system of claim 1, further comprising a geographic position unit coupled to the probe signal generator that determines a geographic position of the underground structure.

3. The system of claim 1, further comprising a characterizing unit, coupled to the probe signal generator, that characterizes a ground medium through which the probe signal penetrates.

4. The system of claim 1, wherein:

the detector comprises a first antenna and a second antenna, each of the first and second antennas receiving the signature signal; and the detector detects a difference between a phase of the signature signal received by the first antenna and a phase of the signature signal received by the second antenna to detect the location of the underground structure.

5. The system of claim 1, wherein:

the detector comprises an antenna array including a plurality of antennas, each of the plurality of antennas receiving the signature signal; and the detector detects a difference between a phase of the signature signal received by each of the plurality of antennas to detect the location of the underground structure.

6. The system of claim 1, further comprising an orientation sensor to detect an orientation of the underground structure.

7. The system of claim 1, wherein the probe signal generator generates one of an electromagnetic probe signal or an acoustic probe signal.

8. The system of claim 1, wherein the probe signal generator comprises a ground penetrating radar system.

9. The system of claim 1, wherein the signature signal is passively generated by the signature signal generator.

10. The system of claim 1, wherein the signature signal is actively generated by the signature signal generator.

11. The system of claim 1, wherein a polarization of the signature signal is orthogonal to a polarization of the probe signal.

12. The system of claim 1, wherein the signature signal has a characteristic in one of the time domain or the frequency domain.

13. The system of claim 1, further comprising a location unit to determine a geographical location of the underground structure.

14. The system of claim 1, further comprising a recorder to record the location of the underground structure.

15. A system for detecting an underground structure, comprising:

a ground penetrating radar system that generates a probe signal;

a signature signal generator provided on the underground structure, the signature signal generator comprising a receiving apparatus to receive the probe signal and a signal generating apparatus that generates a signature signal that is distinguishable from clutter signals received by the ground penetrating radar; and a detector, coupled to the ground penetrating radar system, that detects a location of the underground structure using the signature signal.

16. The system of claim 15, wherein the detector detects an orientation of the underground structure using the signature signal.

17. The system of claim 15, wherein:

the signature signal generator further comprises an orientation apparatus that produces an orientation signal indicative of an orientation of the underground structure, and an encoding apparatus that encodes the orientation signal on the signature signal; and the detector detects the orientation of the underground structure using the encoded orientation signal.

18. The system of claim 15, wherein the signature signal generator further comprises a plurality of orthogonally arranged tilt detectors that detect an orientation of the underground structure.

19. A method for detecting an underground structure, comprising:

generating a probe signal from a signal source separate from the underground structure;

producing a signature signal at the underground structure in response to the probe signal; and detecting a location of the underground structure using the signature signal.

20. The method of claim 19, including the further step of detecting an orientation of the underground structure using the signature signal.

21. The method of claim 19, including the further step of characterizing a ground medium through which the probe signal penetrates.

22. The method of claim 19, including the further step of determining a geographical position of the underground structure.

23. The method of claim 19, wherein the producing step includes the step of passively producing the signature signal.

24. The method of claim 19, wherein the producing step includes the step of actively producing the signature signal.

25. An apparatus for use with a probe signal generating and detection system to detect an underground structure onto which the apparatus is mounted, the apparatus comprising:

a receive antenna that receives a probe signal produced by the probe signal generating and detection system;

a signature signal generating circuit coupled to the receive antenna that generates a signature signal in response to the probe signal; and a transmit antenna, coupled to the signature generating circuit, that transmits the signature signal for reception by the probe signal generating and detection system;

whereby the signature signal generated by the signature signal generating circuit is used by the probe signal generating and detection system to detect a location of the underground structure.

26. The apparatus of claim 25, further comprising an orientation detection device, coupled to the transmit antenna, that detects an orientation of the apparatus.

* * * * *